United States Patent [19]
Minami et al.

[11] Patent Number: 5,889,675
[45] Date of Patent: *Mar. 30, 1999

[54] PICKUP DEVICE

[75] Inventors: Toshiyuki Minami; Hitoshi Matsumoto; Tomoya Okazaki, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 612,430

[22] Filed: Mar. 7, 1996

[30] Foreign Application Priority Data

Jul. 13, 1995 [JP] Japan .................................. 7-177804

[51] Int. Cl.$^6$ .............................. G06F 19/00; B23P 21/00
[52] U.S. Cl. ....................... 364/478.01; 29/705; 198/434; 83/61
[58] Field of Search .............................. 29/740, 743, 721, 29/833; 364/487.01–478.09; 414/273; 198/434; 83/76.8, 100, 61, 69, 73, 74

[56] References Cited

U.S. PATENT DOCUMENTS

| | | |
|---|---|---|
| 4,252,497 | 2/1981 | Burt . |
| 4,978,113 | 12/1990 | McAuley et al. .......................... 271/10 |
| 5,103,733 | 4/1992 | Drapatsky et al. ...................... 101/485 |
| 5,400,497 | 3/1995 | Watanabe et al. ......................... 29/705 |
| 5,450,333 | 9/1995 | Minami et al. ..................... 364/474.09 |
| 5,535,873 | 7/1996 | Sakamoto et al. ........................ 198/434 |
| 5,539,977 | 7/1996 | Kano et al. ................................ 29/833 |
| 5,585,015 | 12/1996 | Hayashi et al. ..................... 219/121.67 |

FOREIGN PATENT DOCUMENTS

| | | |
|---|---|---|
| 0348311 | 12/1989 | European Pat. Off. . |
| A-2735290 | 2/1978 | Germany . |
| 2819441 | 11/1979 | Germany . |
| A-3426056 | 1/1985 | Germany . |
| A-3405909 | 8/1985 | Germany . |
| 270238 | 7/1989 | Germany . |
| 270239 | 7/1989 | Germany . |
| 270240 | 7/1989 | Germany . |
| A-4432909 | 3/1995 | Germany . |
| HEI 4-15299 | 2/1992 | Japan . |
| 4-187333 | 7/1992 | Japan .............................. B21D 45/14 |
| 5-185335 | 7/1993 | Japan .............................. B23P 21/00 |
| 6-144521 | 5/1994 | Japan .............................. B65G 1/137 |
| 6-269586 | 9/1994 | Japan .............................. D05B 37/64 |

Primary Examiner—John Barlow
Assistant Examiner—Shah Kaminis
Attorney, Agent, or Firm—Sughrue, Mion, Zinn, Macpeak & Seas, PLLC

[57] ABSTRACT

A pickup device comprises a memory for storing therein positional data for parts, a camera for detecting a position of the parts, a displacement rate computing section for computing a displacement rate between the positional data stored and a position detected, a hand for picking up parts, a inserting posture deciding section for deciding a posture of the hand such as an inserting position or an inserting direction against the parts, a moving section for moving the hand according to the decided posture, a up-movement pin selecting section for selecting pins required for pushing up only desired parts, an interfering pin removing section for removing pins interfered by the hand, and a pin up-movement control section for raising the selected pins.

10 Claims, 24 Drawing Sheets

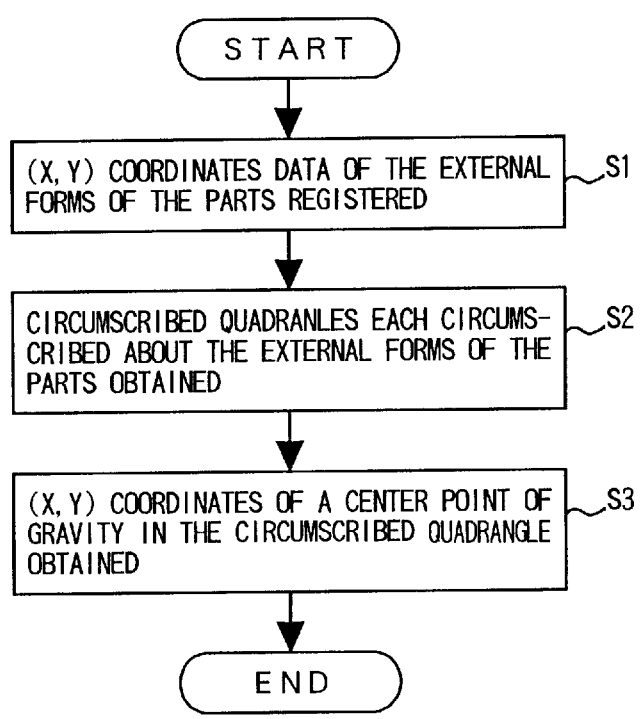

F I G. 1 3
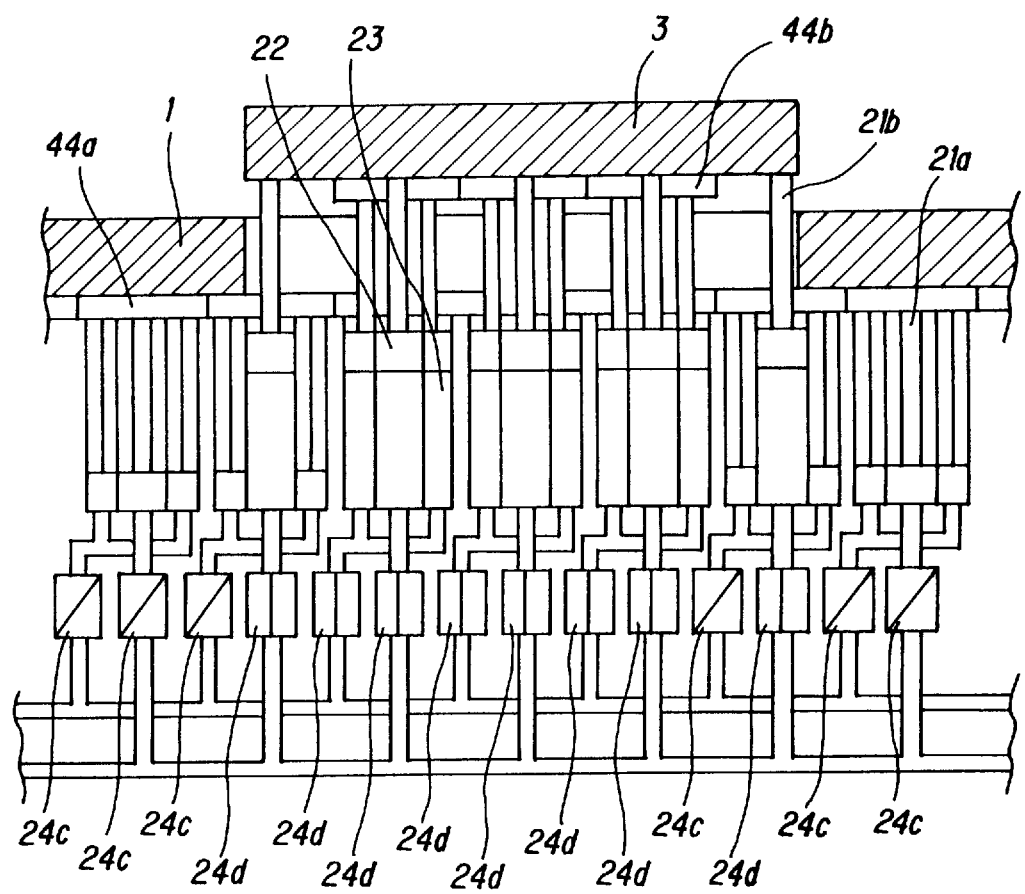

F I G. 1 4
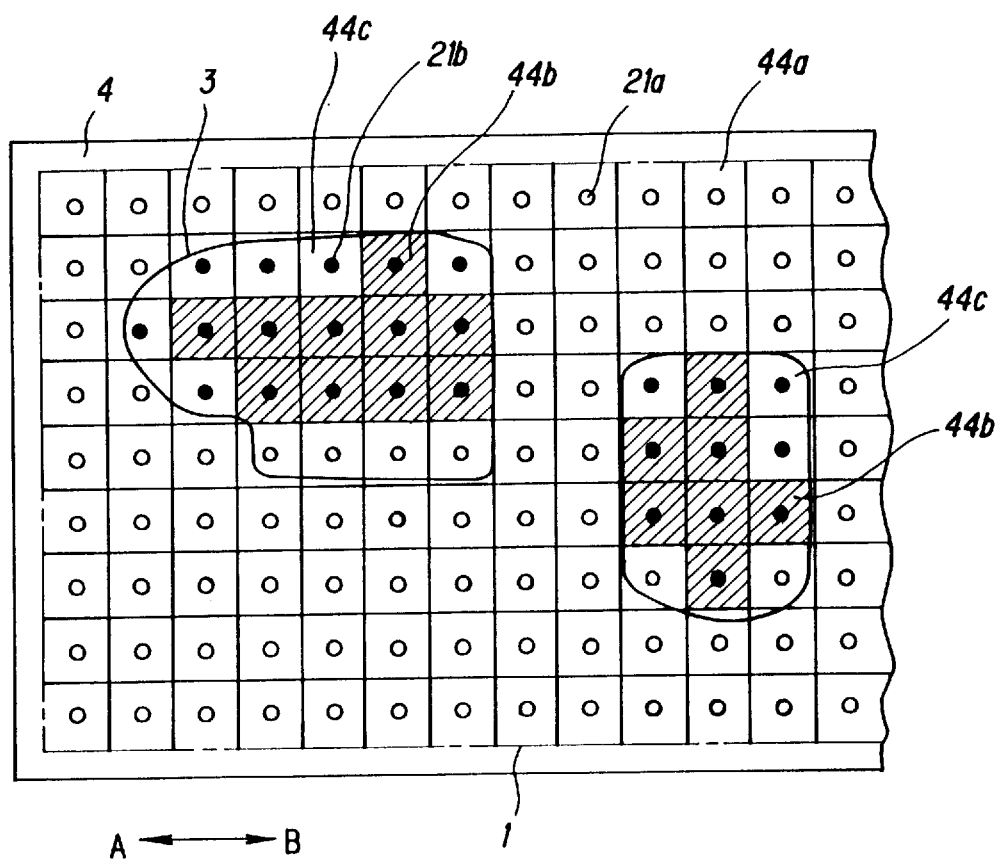

F I G. 1 7
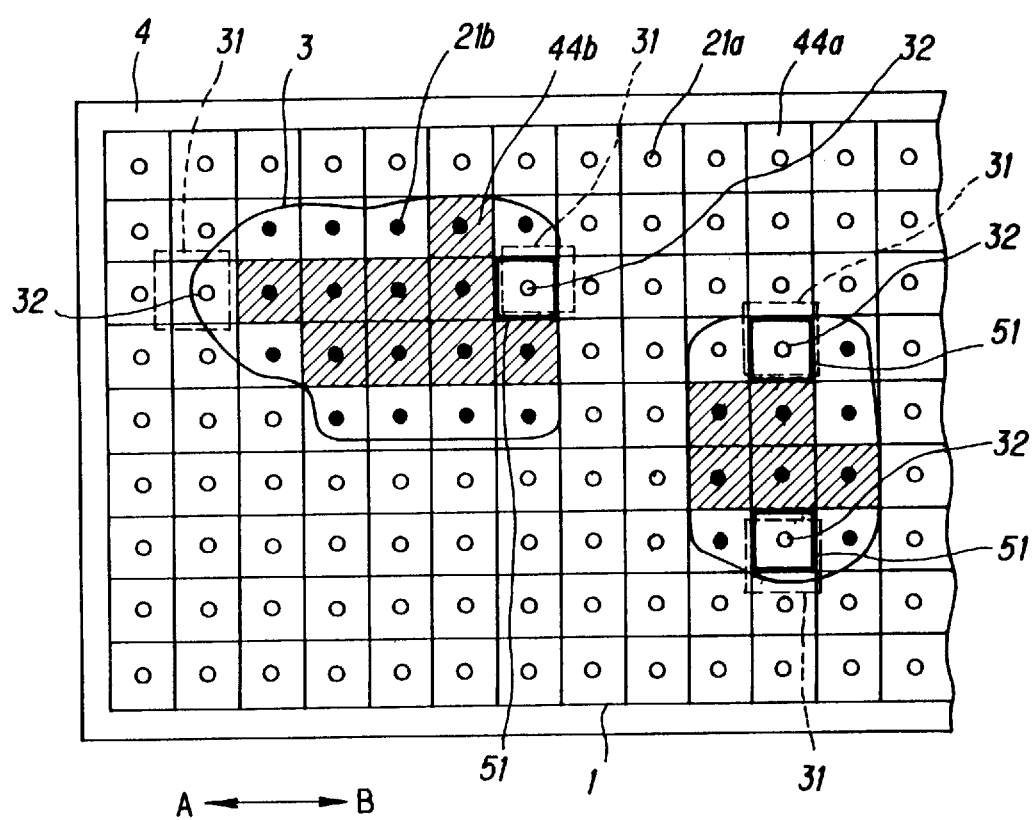

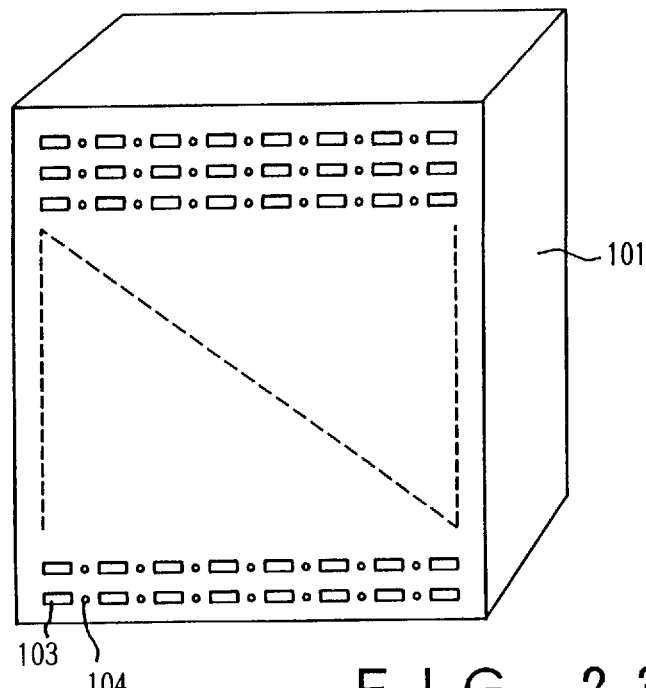
F I G. 2 3 A
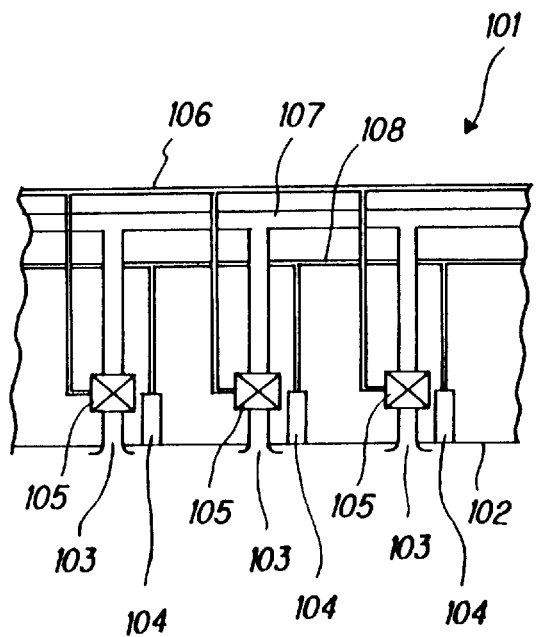
F I G. 2 3 B

PICKUP DEVICE

FIELD OF THE INVENTION

The present invention relates to a pickup device picking up parts cut out by a cutter or other devices and piled-up, and more particularly, to a pickup device which accurately picks up piled-up parts at a time.

BACKGROUND OF THE INVENTION

FIGS. 23A and 23B are explanatory views illustrating general configuration of "A cutter and a method for picking up works to be machined" disclosed in Japanese Patent Laid Open Publication No. 269586/1994, and FIG. 23A shows a suction surface of a pickup device 101, and FIG. 23B shows a cross section of a potion of the suction section in the pickup device 101.

In the pickup device 101 shown in FIGS. 23A and 23B, designated at the reference numeral 102 is a suction surface sucking thereto parts, at 103 a plurality of suction ports provided in the suction surface 102, at 104 a sensor detecting whether parts are sucked or not by each of the suction ports 103, at 105 a suction valve for executing ON/OFF of suction when picking parts up, at 106 a suction valve control line executing open/close control for each of the suction valves 105 when picking parts up, at 107 a suction line provided in the pickup device 101 from a suction duct, and at 108 a sensor control line controlling each of the sensors 104.

As shown in Figures, a plurality of suction ports 103, sensors 104, and suction valves 105 are provided in the pickup device 101, and cut-out parts are picked up by being sucked to the suction surface 102 by means of controlling the suction valve 105.

FIG. 24 is a block diagram illustrating general configuration of "A Device for mounting Parts" disclosed in Japanese Patent Laid Open Publication No. 15299/1992, and FIG. 25 is a flow chart illustrating operations for the device for incorporating parts disclosed in the above publication.

As for a characteristic portion of the device described above, in Step S105 for "fetching thereto an image of parts data", an image of parts 110 picked up by a mounting head 109 is photographed by a camera 108, and the image signal thereof is outputted to an image recognizing section 111. The image recognizing section 111 recognizes an image of a pickup posture of a part 110 according to the image signal from the camera 108, and the recognized image data thereof is outputted to a CPU 112. As a result of the recognition, the CPU 112 computes data for positional displacement between the pickup posture and a normal position of a part.

It should be noted that, in FIG. 24, designated at the reference numeral 150 is a driving mechanism section for driving an incorporated head, at 151 an incorporated program memory, at 152 a storage counter, at 153 a memory for a displacement rate, at 154 is a memory for an average displacement rate. However, as for operations in Step S101 to Step S104 and Step S106 to Step S112 shown in FIG. 25, description thereof is omitted herein.

FIG. 26 is an explanatory view illustrating key configuration of "A separated plate material pickup device for a plate material machining apparatus" disclosed in Japanese Patent Laid Open Publication No. 187333/1992. In the figure, when a separated plate material Wc is to be picked up, in a state where the separated plate material Wc is placed right above the placement section of ejector pins 113, fluid pressure adjusted by pressure adjusting valves 116 or 117 according to either of open/close valves 114 and 115 which is open is indifferently supplied to all of a plurality of fluid pressure cylindrical devices 118.

With this operation, ejector pins 113 are all energized to a position of up-movement, so that the ejector pins 113 will contact a bottom face of the plate material W cramped with a separated plate material Wc and a work-cramp 119 respectively, and upward energizing force will give effects onto the plate material W cramped with the separated plate material Wc and the work-cramp 119.

This energizing force is previously set to a holding up force for holding up only a separated plate material Wc separated from the plate material W cramped with work-cramps 119 without holding up the plate material W cramped with work-cramps 119 according to weight of the plate material W by pressure adjustment for a fluid pressure given to a cylinder room 120 in the fluid pressure cylindrical device 118 therein, so that the ejector pins 113 contacted to the bottom face of the cramped plate material W does not rise any higher due to being kept contacted to the bottom face of the plate material W, while only a separated plate material Wc which is not restrained by cramping with work-cramps 119 is held up by means of up-moving of the ejector pins regardless of its shape and its size.

It should be noted that, in the figure, designated at the reference numeral 319 is a center front work table, at 337 a stem, at 339 a suction pad, at 343 a fluid pressure cylindrical device, at 345 a cylinder tube, at 347 a piston, at 349 a return spring, at 353 a fluid pressure source, at 355 a common path, at 357 and 359 each a parallel path, at 361 a branch path, and at 371 and 373 each a check valve.

However, in the conventional type of the pickup device as described above, the object parts to be picked up are picked up by means of sucking or adsorbing, so that a plurality of piled-up parts to be picked up can not be picked up at a time, which has not been effective on work, and also in a case where materials of parts to be picked up are soft materials such as cloth or sheet materials, crinkles have been generated on the parts when they are placed on their destination caused by their hanging down during carrying the parts.

Also in a disclosure of "A device for mounting parts" disclosed in Japanese Patent Laid Open Publication No. 15299/1992, parts are adsorbed by a adsorbing nozzle, and then posture of the adsorbed parts is recognized, so that, if a position of the parts is largely moved off the position in which the parts are supposed to be at a time of picking them up, the parts have not been possibly picked up accurately.

Furthermore, in a disclosure of "A separated plate material pickup device for a plate material machining apparatus" disclosed in Japanese Patent Laid Open Publication No. 187333/1992, an energizing force gives effects onto all of ejector pins, so that materials which are difficult to be cramped with a work-cramp, for instance, when cloth or sheet materials are picked up, there has been a problem that it is difficult to move up only desired parts.

SUMMARY OF THE INVENTION

It is an object of the present invention to obtain a pickup device which makes it possible to pick up a plurality of piled-up parts at a time even if parts are such materials that are difficult to be cramped with a work-cramp.

In the pickup device according to the present invention, parts piled up can be picked up at one time, and as for the piled-up parts, a displacement rate of the parts is computed just before picking them up, and a hand inserting posture is computed according to the displacement rate, so that the parts can accurately be picked up thereby. Also, even in a case of materials such as cloth and a sheet material which are difficult to work-cramp, only desired parts can be held up. In addition, when inserting a hand, interference between a hand and a pin or pins will not occur, so that parts can accurately be picked up in a state of its being kept held up by the hand.

In another pickup device according to the present invention, pins required for pushing up only a desired parts are selected from a plurality of pins for pushing parts up and the selected pins can be raised, which makes the parts go up, so that the holding means can easily pick them up, and for this reason a plurality of the parts cut out and piled up can more accurately be picked up thereby.

In another pickup device according to the present invention, pins interfering with the holding means can be removed from the selected pins when inserting the holding means into parts, so that parts can be picked up without any interference of the holding means with pins.

In another pickup device according to the present invention, a support plate required for pushing up only a desired parts is selected from a plurality of support plates for pushing parts up, and the selected support plate can be raised, so that parts can stably be raised even if parts are soft materials, for instance, cloth or a sheet material, and for this reason, soft materials cut out and piled up can accurately be picked up at one time.

In another pickup device according to the present invention, a support plate interfering with the holding means can be removed from the selected support plates, so that parts can be picked up without any interference of the holding means with the support plate.

In another pickup device according to the present invention, the holding means has a plurality of claws at a space preventing interference with pins, and can decide an inserting posture of the holding means to the parts according to the displacement rate, so that interference between claws and pins will not occur, and for this reason parts can be picked up without any interference with pins, and a plurality of cutout and piled-up parts can accurately be picked up at a time without hanging down.

Other objects and features of this invention will become understood from the following description with reference to the accompanying drawings.

BRIEF DESCRIPTION OF THE DRAWINGS

FIG. 3 is a flow chart showing a sequence for preprocessing concerning a pickup of the pickup device according to Embodiment 1;

FIG. 13 is a sectional view showing configuration of the peripheral of a support plate up-movement mechanism according to Embodiment 2;

FIG. 14 is a general plan view showing a support plate up-movement mechanism according to Embodiment 2;

FIG. 17 is a general plan view showing another support plate up-movement mechanism according to Embodiment 2;

FIGS. 23A and 23B are explanatory views showing a general configuration of a pickup device according to the conventional type thereof;

DETAILED DESCRIPTION OF THE PREFERRED EMBODIMENTS

Figure 1:
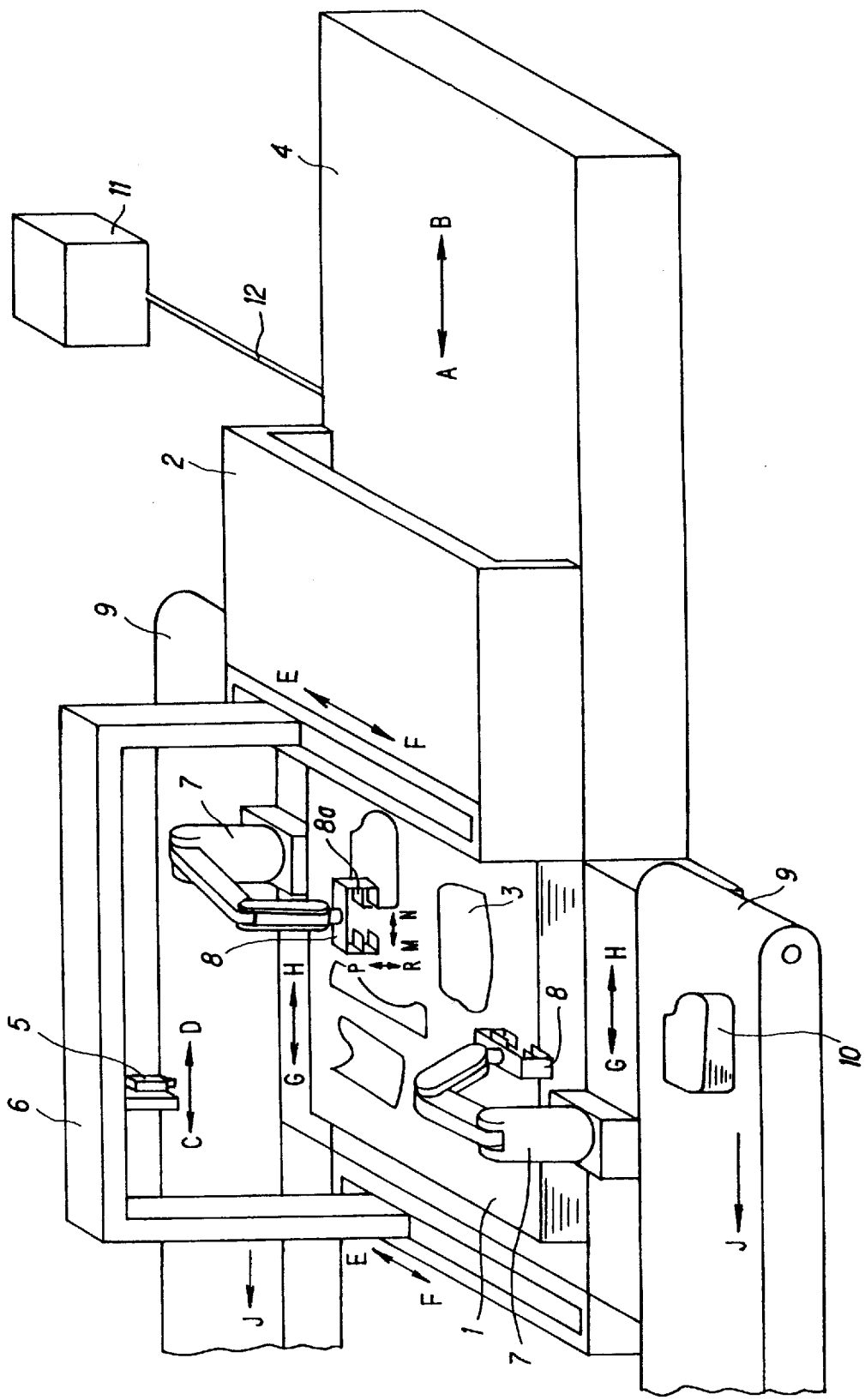
FIG. 1 is an explanatory view showing a general configuration of a cutter including a pickup device according to Embodiment 1.

Detailed description is made hereinafter for embodiments of a pickup device according to the present invention with reference to the related drawings. FIG. 1 is an explanatory view showing general configuration of a cutter including the pickup device according to the present invention. In FIG. 1, designated at the reference numeral 1 is a piled-up work to be machined, at 2 a cutting room for cutting the work 1, at 3 piled-up parts after cutting them out in the cutting room 2.

At 4 a carriage for carrying the work 1 in the direction of the arrow A or the direction of the arrow B, at 5 a camera for photographing images of the parts 3 to detect a position of the parts 3 carried from the cutting room 2 by the carriage 4 and fetching thereto the image data, and at 6 a camera driving device for moving the camera 5 freely in the direction of the arrow C or D, and in the direction of the arrow E or F.

At 7 a pickup device for picking up the parts 3, at 8 a hand attached to an tip section of the pickup device 7 and holding the piled-up parts 3, and the hand 8 can be moved to desired posture according to the pickup device 7. Furthermore the hand 8 has a holding section 8a which is extendable freely in the direction of the arrow M or N, and also movable freely in the direction of the arrow P or R.

At 9 a discharge conveyor, at 10 parts moved to the discharge conveyor 9 by the pickup device 7, and the discharge conveyor 9 moves in the direction of the arrow J to carry the parts 10 to a next machining step. Also at 11 a control unit for controlling each devices described above, and at 12 a cable for connecting between the control unit 11 and each devices.

Figure 2:
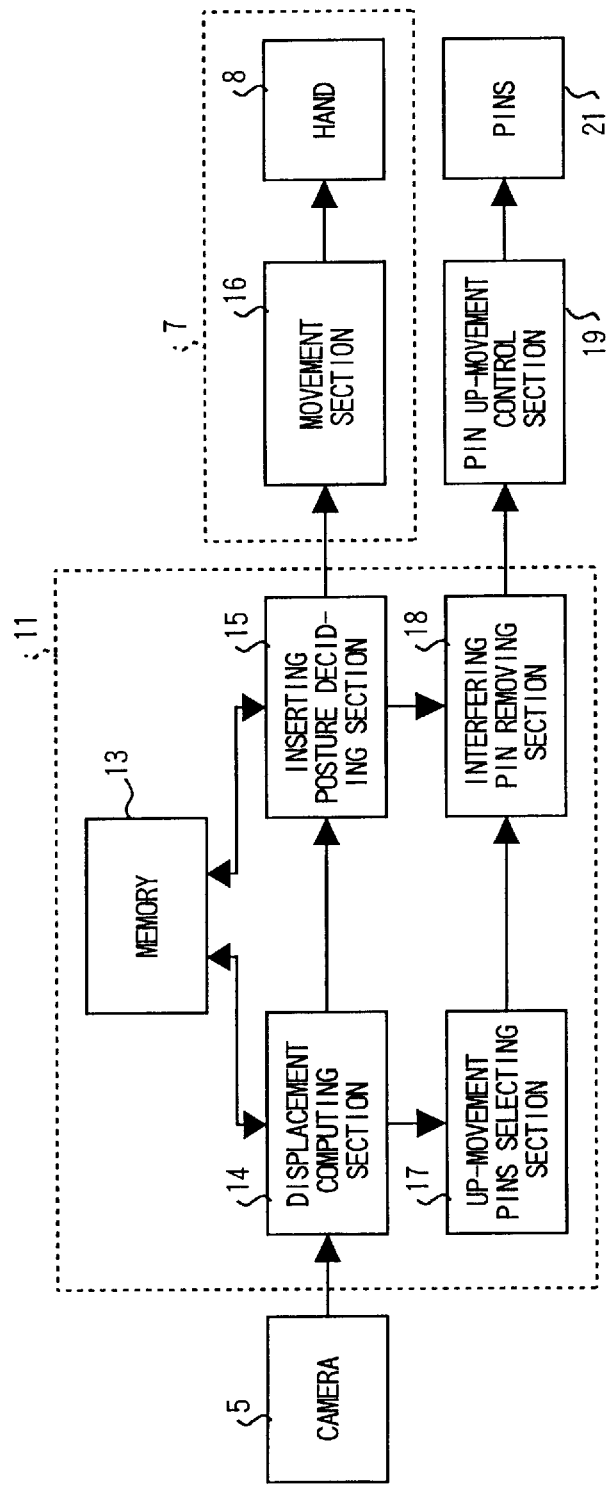
FIG. 2 is a functional block diagram showing general configuration of a control unit controlling the pickup device according to Embodiment 1.

FIG. 2 is a block diagram showing general configuration of the control unit 11 for controlling a pickup device according to the present invention. In the figure, designated at the reference numeral 13 is a memory storing various types of data such as coordinates data of an external form of the parts 3, at 14 a displacement computing section for computing a displacement rate of a position where the parts 3 is present according to image data fetched thereinto by the camera 5, at 15 a inserting posture deciding section for deciding an inserting position and an inserting posture such as an inserting direction or the like when the holding section 8a of the hand 8 is inserted under the bottom face section of the parts 3.

The pickup device 7 comprises a movement section 16 and the hand 8. The movement section 16 moves the hand 8 to the inserting posture decided by the inserting posture deciding section 15.

In the control unit 11, the reference numeral 17 is an up-movement pins selecting section for moving up pins 21 to hold up only the parts 3 to be objected, and the reference numeral 18 is an interfering pin removing section removing pins interfering with the hand 8 out of the selected pins by the up-movement pins selecting section 17.

Furthermore, the reference numeral 19 indicates a pin up-movement control section moving up the pins selected by the up-movement pins selecting section and the interference pin removing section 18.

Next, a description is made for operations. Operations in Embodiment 1 comprises preprocessing operation for picking up the parts 3, pickup controlling operation for the parts 3, up-movement operation of pins 21 for moving up the parts 3, and interference avoiding operation between the pins 21 and the hand 8.

At first, description is made for a sequence for preprocessing operation. FIG. 3 is a flow chart showing a sequence for preprocessing concerning a pickup of the pickup device. Also, FIGS. 4A and 4B are explanatory views showing a relation between an external form of the parts 3 and the (X, Y)coordinates thereof.

Figure 4A:
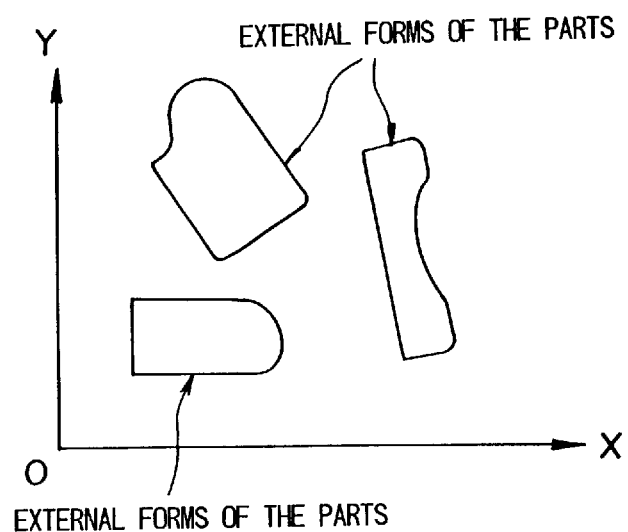
FIGS. 4A and 4B are explanatory views showing a relation between external forms of parts and the coordinate positions thereof according to Embodiment 1.
Figure 4B:
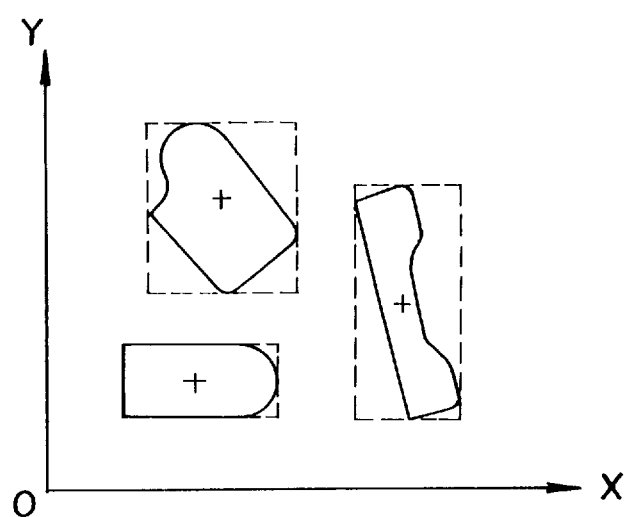

In the flow chart shown in FIG. 3, at first, as shown in FIG. 4A, (X, Y) coordinates data of external forms of the parts 3 each are inputted to the memory for each parts and stored in each memory 13 (S1).

Then, circumscribed quadrangles each circumscribed about the external forms of the parts 3 are obtained (S2) according to the (X, Y) coordinates data of the external forms of the parts 3 registered in the memory 13 in Step S1. In FIG. 4B, quadrangles each indicated by a broken line show quadrangles circumscribed thereabout. The (X, Y) coordinates data of the obtained quadrangle circumscribed thereabout is also stored in the memory 13.

Then coordinates of a center point of gravity in the circumscribed quadrangle obtained in Step S2 is obtained (S3). In FIG. 4B, a mark of "+" indicates a center point of gravity of each circumscribed quadrangle. The (X, Y) coordinates data of the center point of gravity is stored in the memory 13. This operation, preprocessing operation in pre-stage where pickup operation for the parts 3 is executed is complete.

These preprocessing is previously executed for each work if there are a plurality of types of work 1, and data obtained is stored in each memory 13 respectively.

Figure 5:
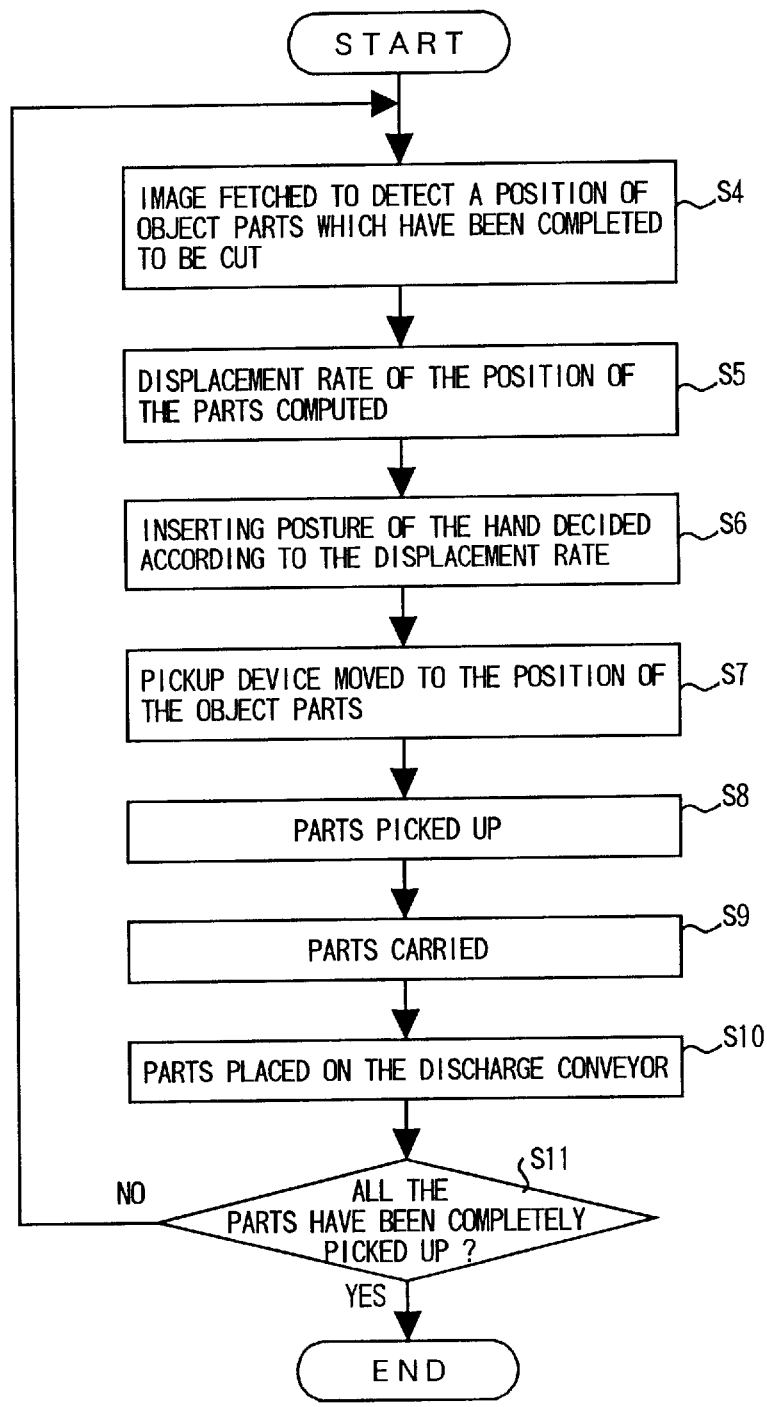
FIG. 5 is a flow chart showing a sequence for controlling operation concerning a pickup of the pickup device according to Embodiment 1.

Next, a description is made for a sequence for a pickup controlling operation. FIG. 5 is a flow chart showing a sequence for controlling operation concerning a pickup in the pickup device.

In the flow chart shown in FIG. 5, at first, work 1 of which cutting has been completed is carried out from the cutting room 2 in the direction of the arrow A by the carriage 4. Herein, the camera driving device 6 moves the camera 5 above the object parts 3 of which cutting has been completed, and fetching thereinto the image thereof can be executed to detect a position of the parts 3 by the camera 5 (S4).

Namely, the camera driving device 6 moves the camera 5 in the preprocessing step for a pickup according to the data stored in the memory 13 so that the center coordinates of the camera 5 comes right over to the (X, Y) coordinates indicating the mark of "+" which is a center point of gravity of the circumscribed quadrangle in FIG. 4B, and places the camera 5 at the position where entire external forms of the object parts 3 can be caught by the camera 5. Then an image of the object parts 3 is fetched thereinto.

Then, in the displacement computing section 14, (X, Y) coordinates data for the external form portion of the parts 3 is extracted from the image fetched thereinto by the camera 5 in Step S4, and a displacement rate between an actual position of the parts 3 and the original position thereof is computed (S5) by means of comparing the extracted (X, Y) coordinates data for the external form portion of the part 3 to the (X, Y) coordinates data for the original external form of the original part 3 stored in the memory 13 in the preprocessing step for a pickup (Step S1 shown in FIG. 3).

In the inserting posture deciding section 15, an actual inserting position and an actual inserting posture such as an inserting direction or the like of the hand 8 are decided (S6) according to the displacement rate computed in Step S5. The method of deciding an inserting posture of the hand 8 is described later.

The hand 8 is moved to the position (S7) where the parts 3 can be picked up thereby in a state of the inserting posture of the hand 8 decided in Step S6.

Then the holding section 8a are inserted into the piled-up parts 3 from the both directions to the inserting direction of the hand, and the holding section 8a is controlled to move in the direction of thickness of the piled-up parts 3 (in the direction of the arrow P and R), so that the parts 3 is inserted by the holding section 8a from the both directions to the inserting direction of the hand 8 and is picked up (S8).

In Step S8, in order to pick up the parts 3 by the hand 8, the parts 3 is required to be moved up higher than that of work 1. The up-movement of the parts 3 is described later.

Then, by means of rotating the pickup device 7 keeping in holding the parts 3, the picked-up parts is carried onto the discharge conveyor 10 (S9). The picked-up parts 3 is placed on the discharge conveyor 10 (S10) by means of removing the insertion from the parts 3 by the hand 8.

Then, determination is made as to whether every one of desired parts 3 has been completely picked up or not (S11). A number of parts required to be picked up is previously stored in the memory 13 of the control unit 11, and at each time when one of the parts has been completely picked up, one parts is subtracted from the number of parts, and in a case where a number of parts 3 is one or more after subtraction, determination is made that desired parts 3 are still remained. And if it is determined that parts 3 is remained, system returns to Step S4, and controlling operation from the Step S4 to Step 10 is repeated until it is determined that a pickup for the whole parts has been completed.

On the other hand, in Step S11, if it is determined that a number of parts becomes zero after subtraction, determination is made that a pickup for the whole parts has been completed. And if it is determined that a pickup therefor is all complete, a sequential controlling operation for a pickup is finished.

Next, a description is made for the method of deciding an inserting posture of the hand 8 in Step S6 shown in FIG. 5.

Figure 6:
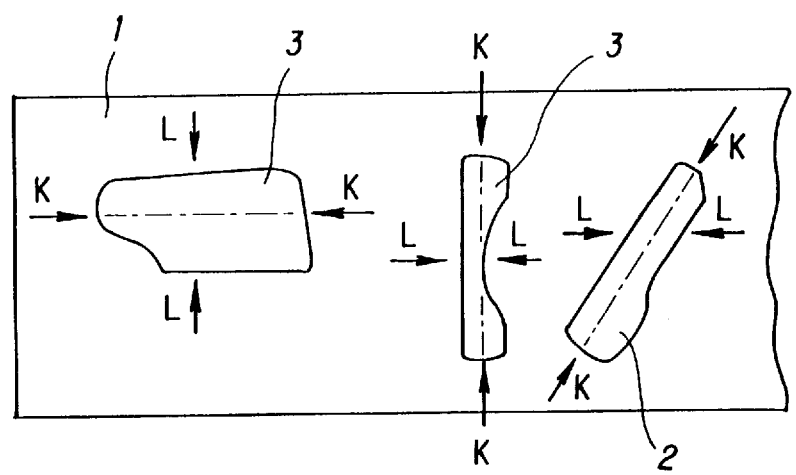
FIG. 6 is an explanatory view showing a relation between parts and inserting positions as well as inserting directions of the hand according to Embodiment 1.

FIG. 6 is an explanatory view showing a relation between the parts 3 and an inserting position as well as an inserting direction of the hand 8, and in FIG. 6, as an inserting direction of the hand 8, the direction where the parts 3 will not hang down while carrying the parts 3, namely the longitudinal direction of the parts 3 (the direction of the arrow K) is computed. For this reason, the direction where the parts 3 will hang down when the parts 3 is carried, for instance, like in the direction of the arrow L is not computed.

As a method of computing the longitudinal direction of parts 3, at first, axes (a dashed line in FIG. 6) of an external form of the parts obtained in Step S2 are obtained. Among combinations of intersections of the obtained axes and an external form of the parts 3, a position of coordinates of the combination having the longest distance between them is set to the inserting position of the hand 8. Also, the axial direction is decided as a longitudinal direction thereof, which is set to the inserting direction when the hand 8 is inserted into the parts 3.

Next, a description is made for configuration of the pin up-movement control section 19 to move up parts 3 by means of holding the parts 3 from the bottom side thereof.

Figure 7:
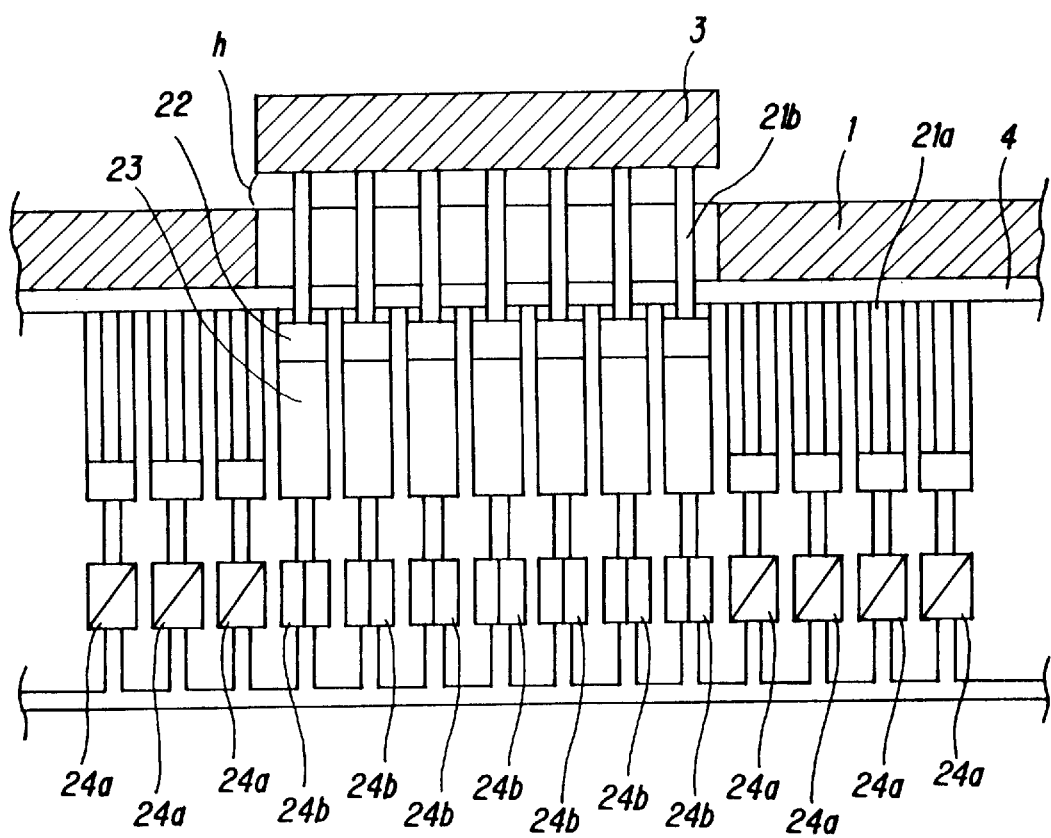
FIG. 7 is a sectional configuration view showing the peripheral of a pin up-movement mechanism according to Embodiment 1.

FIG. 7 is a cross sectional view showing configuration of a pin up-movement mechanism for moving pins 21 up. In the figure, the reference numeral 21 indicates pins movable upward and downward and for moving the parts 3 upward, and as shown in the figure, pins 21 are under side of the place with the work 1 thereon, and a plurality of pins are provided at a space. Herein, the reference numeral 21a indicates pins in the state of not rising, while the reference numeral 21b indicates pins in the state of rising.

Also, designated at the reference numeral 22 is a piston for moving the pins 21 upward and downward, at 23 a cylinder for pushing up the piston 22, and at 24 an electromagnetic valve for opening or closing by electromagnetic force according to an electric signal. Pressure in the cylinder 23 (e.g. fluid pressure) is adjusted by opening/closing operations of the electromagnetic valve 24, which controls pushing-up operation for the piston. Herein, the reference numeral 24a indicates an electromagnetic valve in the state of its closing, while the reference numeral 24b indicates an electromagnetic valve in the state of its opening.

Figure 8:
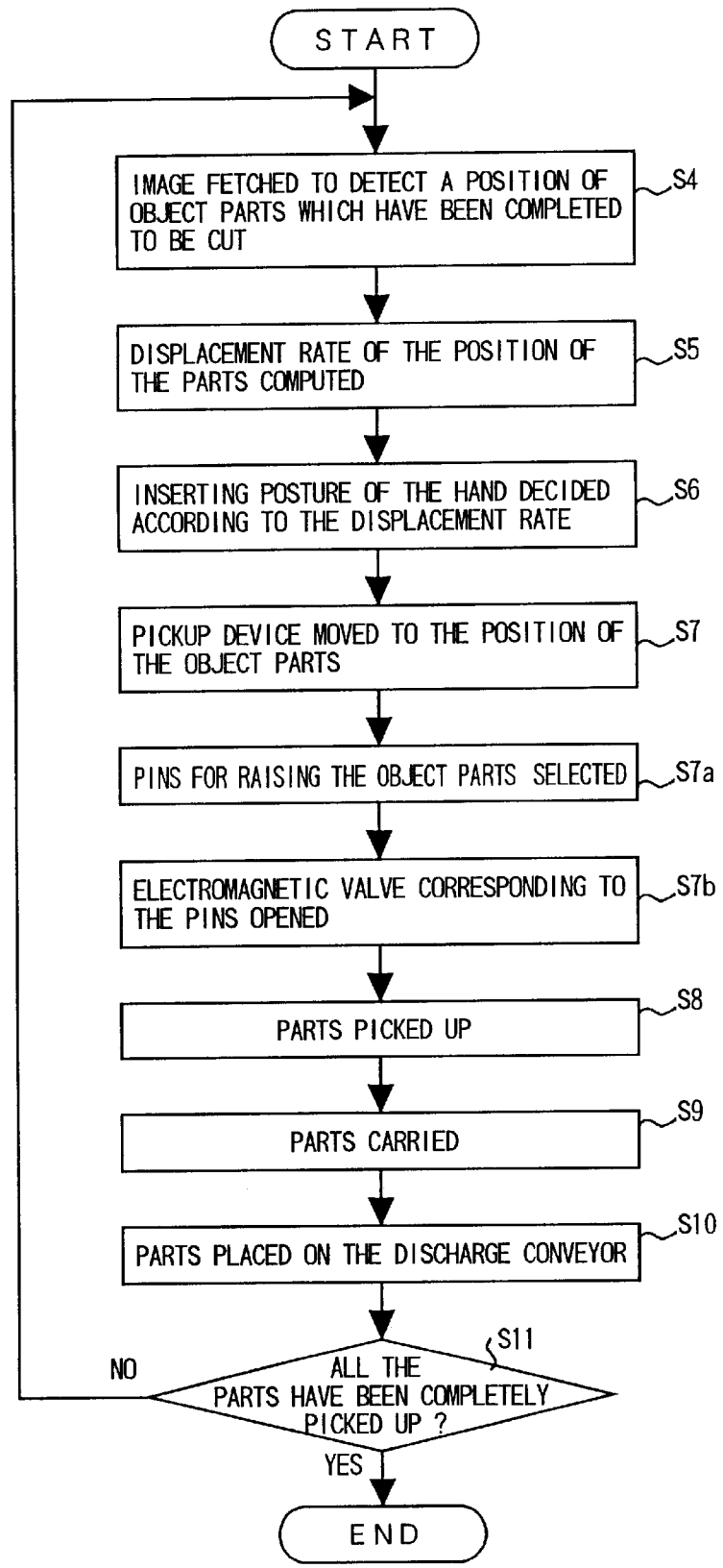
FIG. 8 is a flow chart showing a sequence for controlling operation concerning a pickup including an up-movement operation for parts by up-movement of a pin according to Embodiment 1.
Figure 9:
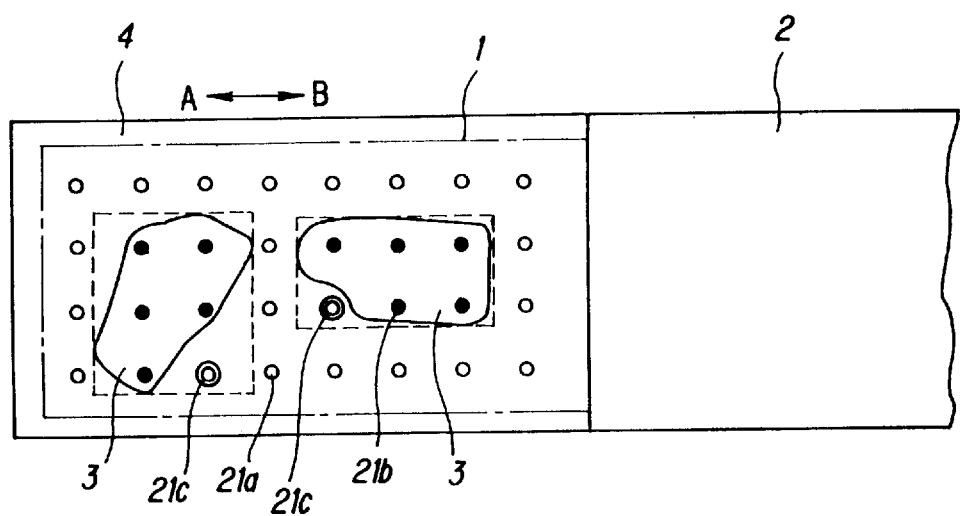
FIG. 9 is a general plan view of a pin up-movement mechanism according to Embodiment 1.

Next, a description is made for a sequence for moving the pin 21 upward by the pin up-movement control section 19. FIG. 8 is a flow chart showing a sequence for control operations for picking up including those for up-movement of the pin 21 by the pin up-movement control section 19, while FIG. 9 is a flat view showing general configuration of the pin up-movement mechanism.

In the flow chart shown in FIG. 8, in steps S4 to S7, and in step S8 and step S11, the same processing as that in each step shown in FIG. 5 is executed, so that the same reference numerals are assigned to the corresponding sections, and description thereof is omitted herein.

In step S7, after the pickup device 7 is moved to a position where parts can be picked up at a posture in the inserting direction of the hand 8 (Refer to FIG. 6) decided in step S6, a pin 21b required for moving upward the parts 3 to be picked up is selected according to a displacement rate of the parts 3 computed in step S5 (S7a).

When selecting the pin 21b, at first, in step S4, (X, Y) coordinate data indicating an actual position of an external form section of the parts 3 is extracted from the image data fetched with the camera 5 in step S4, and a circumscribed quadrangle (a section shown with a dashed line in FIG. 9) circumscribing the external form section is obtained depending on said (X, Y) coordinates data extracted as described above.

Pins residing inside the circumscribed quadrangle are extracted according to the (X, Y) coordinates data of the circumscribed quadrangle, and said extracted pins are selected as the first candidate pins. In FIG. 9, write circle portions 21a, black circle portions 21b, and double circle portions 21c indicate a pin respectively. For this reason, the first candidate pins are the pin 21b at the black circle portions and the pin 21c at the double circle portions each residing inside the circumscribed quadrangle.

Then, of the first candidate pins, determination is made as to whether each of the first candidate pins is within the external form section or not according to the (X, Y) coordinates data for the external form section of the parts 3 stored in the memory 13 of the control unit 11, said data corrected according to the displacement rate computed in step S5. As a result, pins determined as residing within the external form section of the parts 3 are determined as pins required for moving the parts upward. In FIG. 9, of the first candidate pins, only the pins 21b at the black circle section are selected, and the pins 21c at the double circuit portions are excluded.

Pins 21b required for moving upward the parts 3 to be picked up are selected as described above. It should be noted that, for selecting the pins 21b, appropriate pins may directly be selected from, for instance, the (X, Y) coordinate data for the external form.

In step S7a, an electromagnetic valve 24b corresponding to the pin 21b selected in step S7a is opened (S7b). When the electromagnetic valve 24b is opened, a pressure inside a cylinder 23 to which the electromagnetic valve 24b is connected goes up, the piston 22 is pushed upward by energizing force generated by the pressure, and also the pin 21b goes upward in association with up-movement of the piston 22.

Then, electromagnetic valves 24a corresponding to pins other than the pins 21b selected in step S27a. Namely, the pins 21a at white circles and pins 21c at double circle portions shown in FIG. 9 are kept closed. As a result, a pressure inside the cylinder 23 does not change, so that the pins 21a and pins 21c do not go up.

A height to which the pin 21b is moved up is the one allowing formation of a space ("h" shown in FIG. 7) into which the hand 8 can insert the holding section 8a between a upper surface section of the work 1 piled up there and a bottom surface section of the parts 3 when the pin 21b goes up.

Also, when the height up to which the works 1 are piled changes according to a thickness of each of the works 1 piled up or a number of works piled up there, by adjusting a pressure inside the cylinder 23 for realizing the optimal space h according to the height, the height to which the pin 21b goes up may be adjusted.

Thus the parts 3 raised in association with up movement of the pins 21b is held by between and picked up by the hand 8 (S8).

Figure 10:
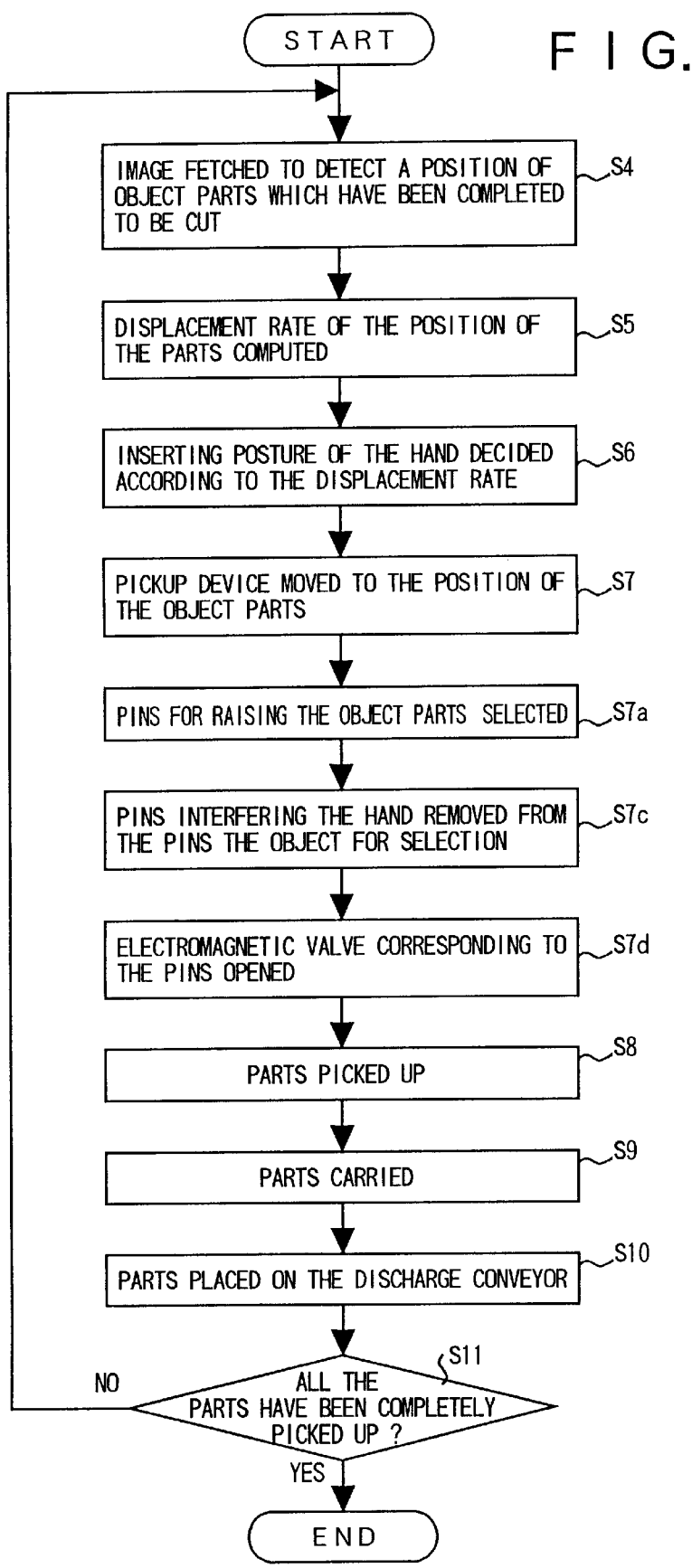
FIG. 10 is a flow chart showing a sequence for operations to avoid interference between pins and a hand according to Embodiment 1.

Next, a description is made for a sequence of operations of the interfering pin removing section 18 for preventing interference between the selected pins 21b and the hand 8. FIG. 10 is a flow chart showing the operating sequence, and FIG. 11 is a substantially flat view showing the pin up-movement mechanism.

Figure 11:
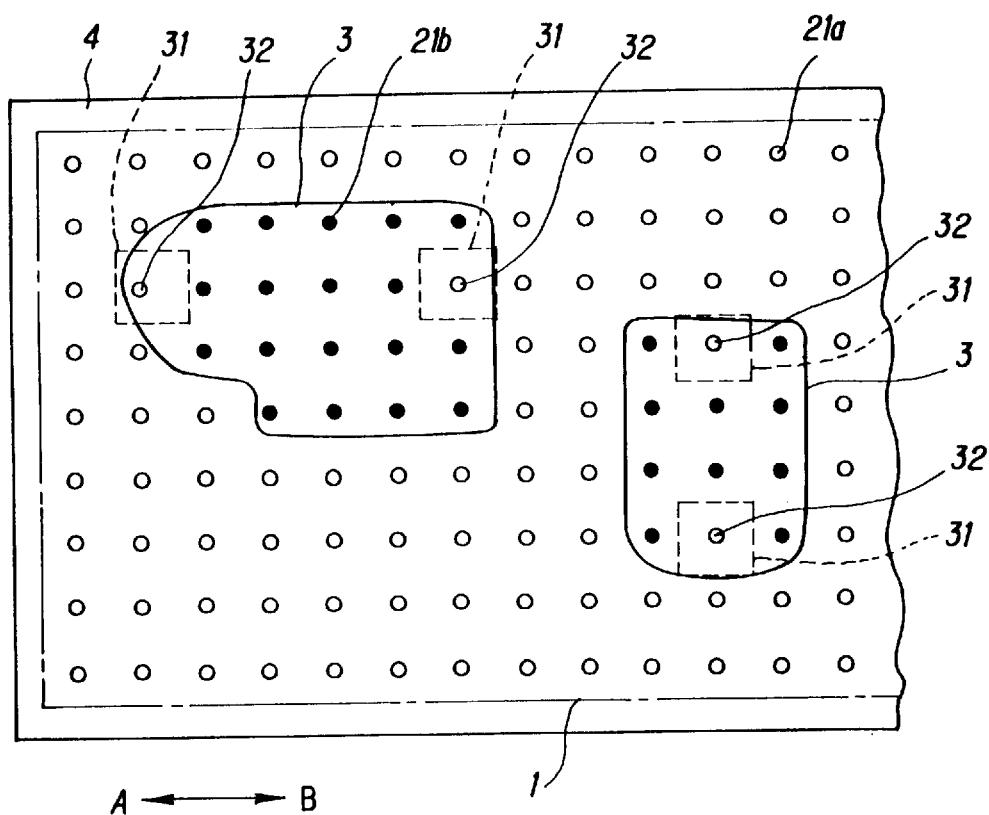
FIG. 11 is a general plan view of another pin up-movement mechanism according to Embodiment 1.

In FIG. 11, a quadrangle portion 31 expressed with a dashed line indicates a position (hand inserting position) where the hand holding section 8a of the hand 8 is inserted under the bottom surface of the parts 3. In the flow chart shown in FIG. 10, steps S4 to S7, and steps S8 to S11 indicate the same operation as that in each step shown in FIG. 5, and step S7a indicates the same operation as that in step S7a shown in FIG. 8, so that the same reference numerals are assigned to the same step and description thereof is omitted herein.

In step S7a, after the pins 21b required for moving upward the parts 3 to be picked up have been selected, of the pins 21b required for moving upward the selected parts, pins interfered by the holding section 8a of the hand 8, namely pins 32 giving interference to a hand inserting position 31 are removed from the pins to be raised upward (S7c).

As a method of extracting the pins 32, proposed in the method such as, at first a circle with a certain radius is defined at the hand inserting position ((X, Y) coordinate data thereof) decided in step S6 as the center. Then, of the pins 21a selected in step S7a, the pin residing inside the circle with a certain radius is extracted.

Then electromagnetic valves 24b corresponding to the remaining pins 21b after the pins 32 have been removed in step S7c are opened (S7d). With this operation, only the object parts is raised upward.

With Embodiment 1, a plurality of parts piled up can be picked up all at once, and also for parts piled up, a positional displacement rate of parts is computed just before picking up and a posture of the hand for insertion is decided depending on the computed positional displacement rate, so that it is possible to accurately picked-up parts.

Also in case of materials not suited to work clamping such as a cloth or a sheet material, it is possible to pick up only desired parts. Also when the hand is inserted, interference between the hand and parts does not occur, so that parts can accurately be picked up in its raised state.

Figure 12:
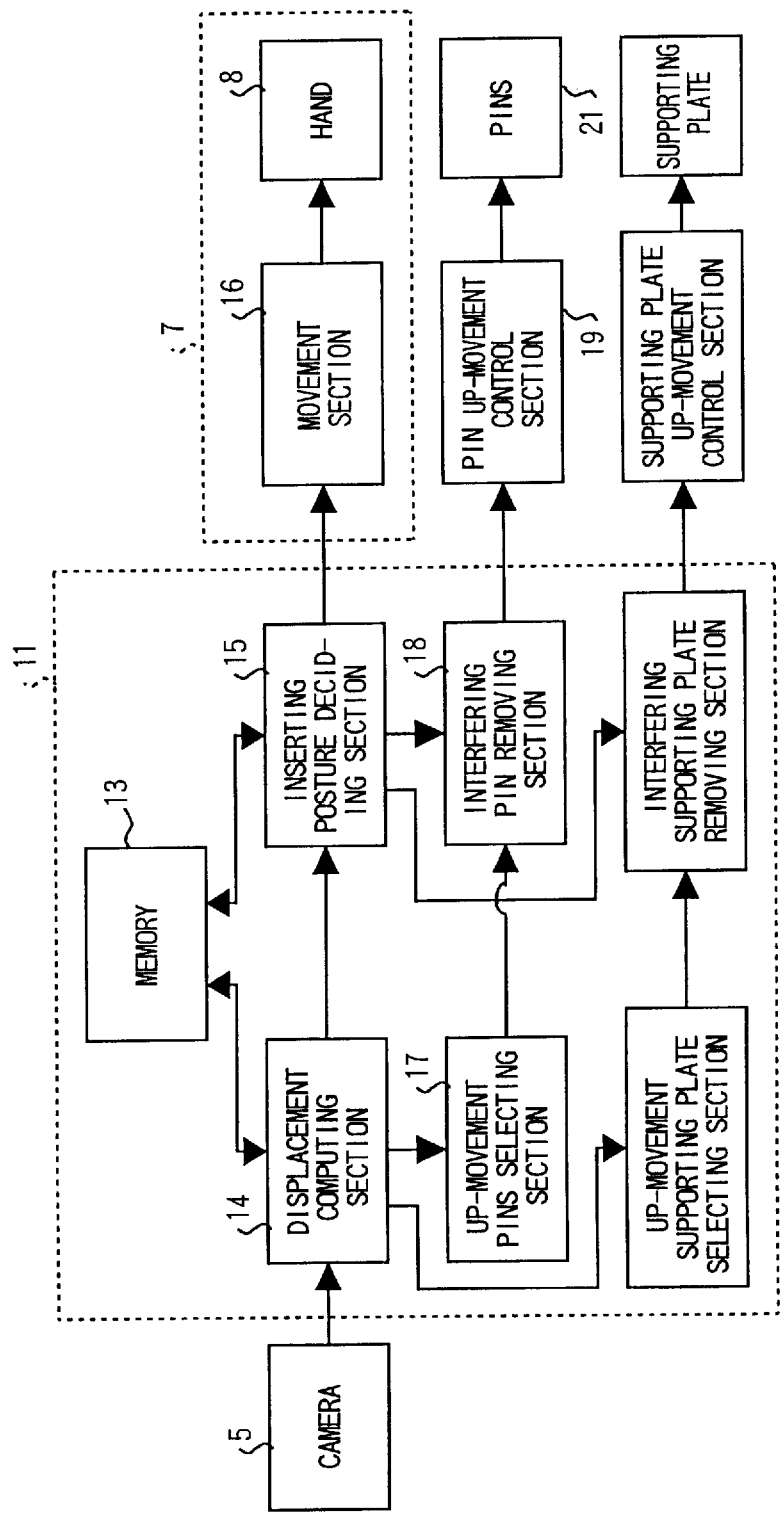
FIG. 12 is a functional block diagram showing general configuration of a control unit controlling the pickup device according to Embodiment 2.

Next, a description is made for a pickup device according to Embodiment 2 of the present invention. FIG. 12 is a block diagram showing general configuration of the control unit 11 for controlling the pickup device according to Embodiment 2. In this figure, the same reference numerals are assigned to the same portions as those in the control unit 11 according to Embodiment 1 shown in FIG. 2, and description thereof is omitted herein.

In the figure, designated to the reference numeral 41 is a up-movement supporting plate selecting section for moving upward a supporting plate 44 for raising only the object parts 3, at 42 an interfering supporting plate removing section for removing supporting plates interfering the hand 8 from the selected supporting plates among the supporting plates selected by the up-movement supporting plate selecting section, and at 43 a supporting plate up-movement control section for moving upward the supporting plate 44 selected by the up-movement supporting plate selecting section 41 and the interfering supporting plate removing section 42.

FIG. 13 is a cross-sectional view showing configuration around the supporting plate up-movement mechanism, and FIG. 14 is a substantially flat view showing as action around the supporting plate up movement mechanism. In FIG. 13 the reference numeral 44 indicates a supporting plate for raising the parts 3 upward. The reference numeral 44a indicates a supporting plate in its normal state, namely before raise upward, while the reference numeral 44b indicates the supporting plate when raised up.

Also as understood from FIG. 14, the supporting plate 44 has a quadrangle face for contacting the parts 3 with a pin 21 provided at a center thereof. An upward movement of the supporting plate 44 is not always synchronous to that of the pin 21 located at the center, and each can move upward independently. For this reason, it is possible to move upward only the pin 21b without moving up the supporting plate 44 at an edge section of the parts 3 to be raised upward.

It should be noted that a form of the supporting plate 44 and a positional relation between the supporting plate 44 and the pin 21 are not limited to those described above.

Figure 15:
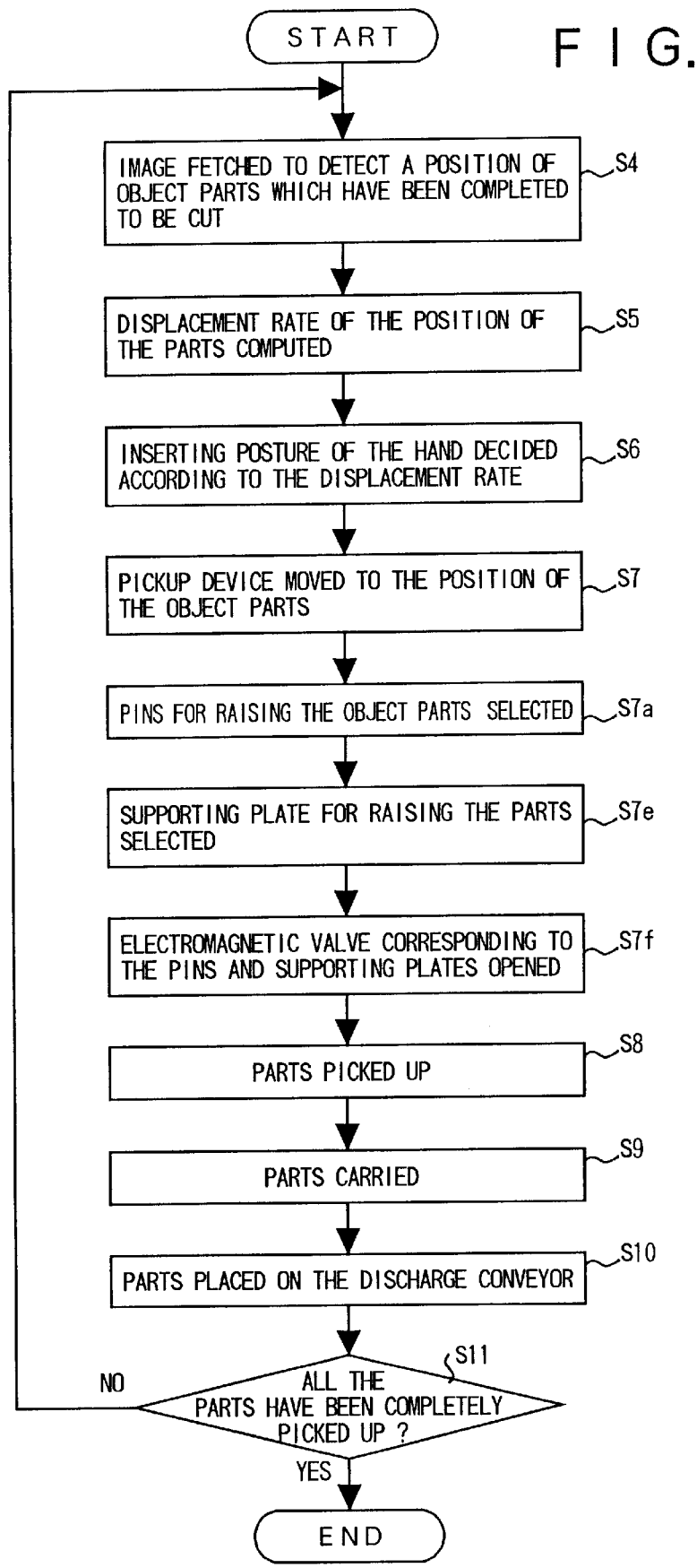
FIG. 15 is a flow chart showing a sequence for controlling operation concerning a pickup including an up-movement operation for parts by up-movement of the support plate according to Embodiment 2.

FIG. 15 is a flow chart showing a sequence of operations for raising the parts 3. In the flow chart shown in FIG. 15, steps S4 to S7, and steps S8 to S11 indicate the same operation as that in each of the corresponding steps in FIG. 5, and step S7a indicates the same operation as that in step S7a shown in FIG. 8, so that description thereof is omitted herein.

In step S7a, the pins 21b required for raising the parts 3 to be picked up are selected, and then supporting plates 44b required for raising the parts 3 to be picked up are selected according to a positional displacement rate of the parts 3 computed in step S5 (S7e).

When selecting the supporting plates 44b, at first supporting plates having correspondence with the pins 21b selected in step S7a are extracted, and the extracted supporting plates are regarded as candidate supporting plates. In FIG. 14, the first candidate supporting plates are supporting plates 44b and 44c corresponding to the pins 21b shown with a black circle respectively.

Then of the first candidate supporting plates, according to the (X, Y) coordinate data for an external form section of the parts 3 corrected according to the displacement rate computed in step S5 and stored in the memory 13 inside said control unit 11, determination is made as to whether each of the first candidate supporting plates is within the external form section of the parts 3 or not. Then according to a result of determination above, all the supporting plates recognized as within the external form section of the parts 3 are selected as those required for raising the parts 3 upward.

In FIG. 14, of the first candidate supporting plates, only those inside the shadowed sections are selected, and the supporting plates 44c are excluded. It should be noted that, as a method of selecting supporting plates 44b required for raising the parts 33 to be picked up, other method such as directly selecting object supporting plates from the (X, Y) coordinate data for the external form may be employed.

Then electromagnetic valves 24d corresponding to the pins 21b and supporting plates 44b selected in step S7a and step S7e respectively are opened (S7f). When the electromagnetic valves 24d are opened, a pressure inside the cylinder 23 to which the electromagnetic valves 24d are connected goes up, the piston 22 is moved upward by the pressure, and the pins 21b and supporting plate 44b goes up in association with the up-movement of the piston 22.

Then, the electromagnetic valves 24c corresponding to pins other than the pins 21b selected in Step S7a, namely pins at white circles in FIG. 14, and as well as to supporting plates other than the supporting plates 44b selected in step S7e, namely supporting plate other than those showing the shadowed sections in FIG. 14 are kept closed, and a pressure inside the cylinder 23 does not change, so that the pins 21a and supporting plates 44a, 44b doe not go up. Thus, the parts 3 raised upward in association with up-movement of the pins 21b and supporting plate 44b are held by between and picked up by the hand 8 (S8).

Next, a description is made for a sequence of operations of the interfering supporting plate removing section 42 for preventing interference between the pin 21b as well as the supporting plate 44 and the hand 8.

Figure 16:
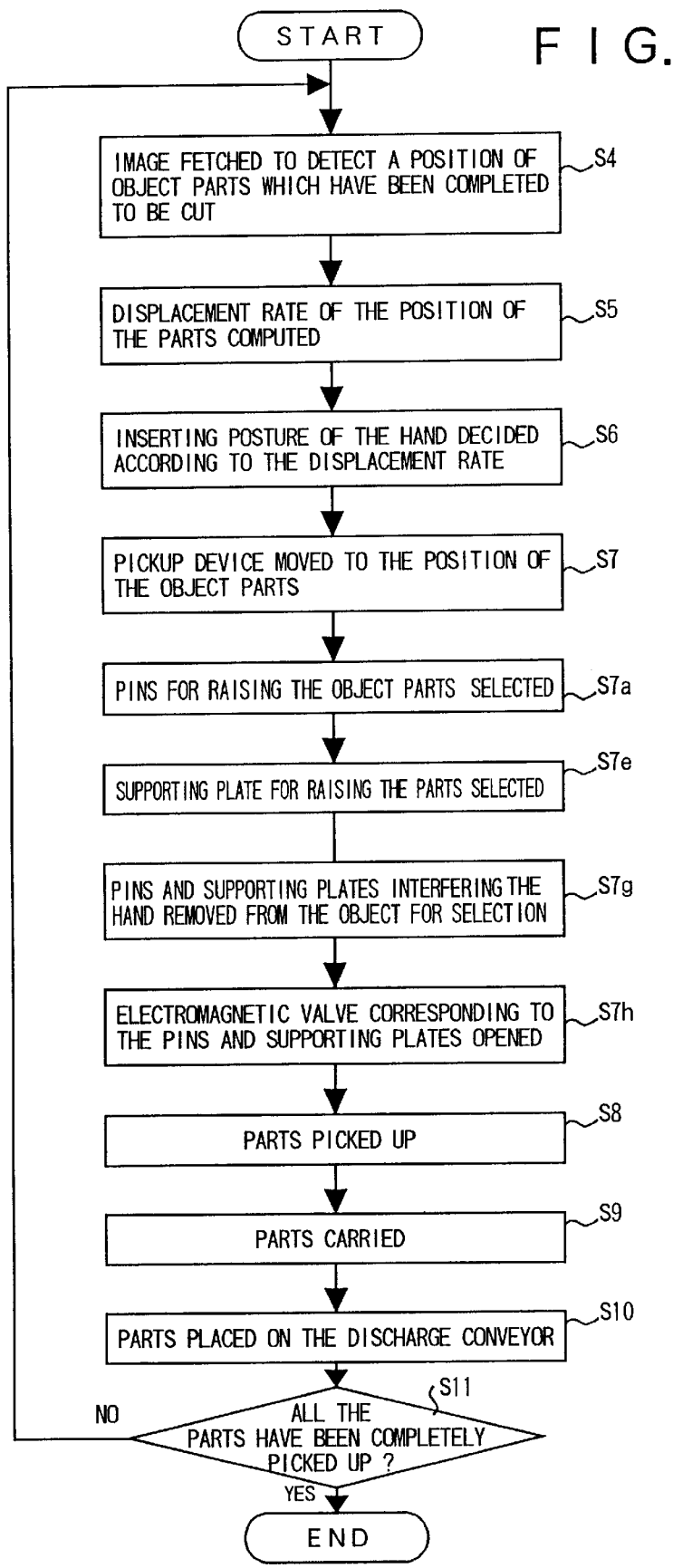
FIG. 16 is a flow chart showing a sequence for operations to avoid interference between a support plate and a hand according to Embodiment 2.

FIG. 16 is a flow chart showing the operational sequence, and FIG. 17 is a substantially flat view showing a mechanism for moving upwards the pins and supporting plates. In FIG. 17, the portion 31 expressed by a dashed line indicates a position where the holding section 8a of the hand 8 is inserted (hand inserting position) like in FIG. 11 showing Embodiment 1.

In the flow chart shown in FIG. 16, steps S4 to S7 and steps S8 to S11 indicate the same operation as that in each of the steps shown in FIG. 5, and step S7a indicates the same operation as that in step S7a showing in FIG. 8, and also the step S7e indicates the same operation as that in step S7e shown in FIG. 13, so that the same reference numerals are assigned and description thereof is omitted herein.

In step S7e, after pins 21b and supporting plates 44b required for raising the parts 3 to be picked up have been selected, of the pins 21b and supporting plates 44b required for raising the selected parts upward, pins 32 and supporting plates 51 interfering the hand inserting position 31 (within the sections each encircled with a bold line in FIG. 17) are removed from the objects for selection for up-movement (S7g).

The method of selecting pins 32 was described in relation to Embodiment 1, so that description thereof is omitted herein. As a method of extracting the supporting plates 51, at first a circle having a certain radius is defined with the inserting position ((X, Y) coordinate data) for the hand 8 as a center, and then of the supporting plates 44b selected in step S7e, supporting plates present inside the circle having a certain radius may be extracted.

Then, electromagnetic valves 24d corresponding to the remaining supporting plates 44b after the supporting plates 51 was removed in step S7g (S7h).

With Embodiment 2, parts is raised by using supporting plates in addition to pins, even a soft material such as cloth or a sheet material can be raised up in stabled conditions. Also when a hand is inserted, interference between the hand and a supporting plate does not occur, so that the parts can accurately be picked up in its rased state.

Figure 18:
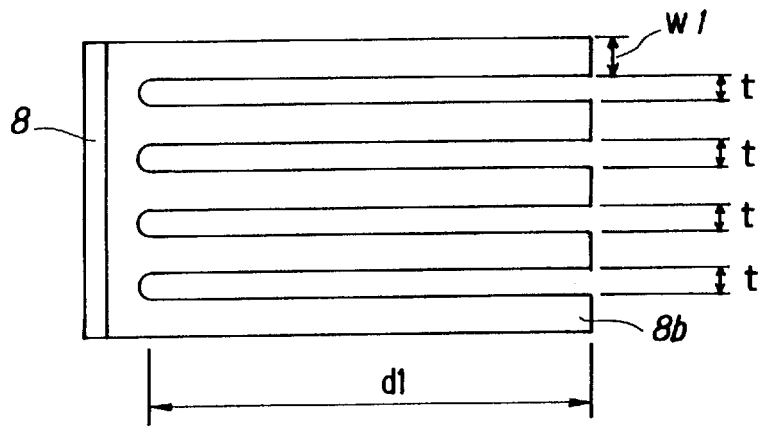
FIG. 18 is an explanatory view showing a shape of a hand according to Embodiment 3.
Figure 19:
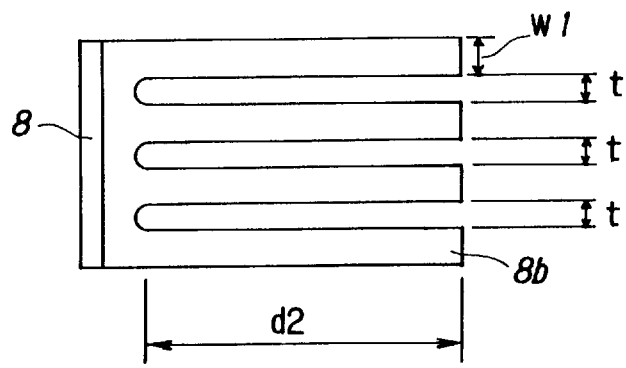
FIG. 19 is another explanatory view showing a shape of a hand according to Embodiment 3.
Figure 20:
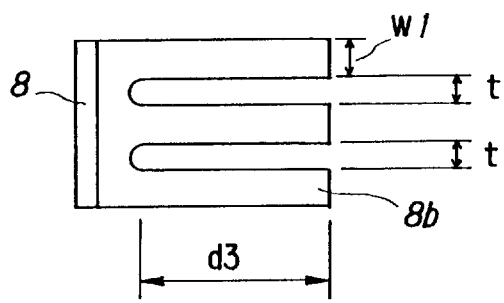
FIG. 20 is another explanatory view showing a shape of a hand according to Embodiment 3.

Next, a description is made for the hand 8 in the pickup device according to Embodiment 3 of the present invention when it picks up the parts 3. FIG. 18, FIG. 19 and FIG. 20 are explanatory views each showing a form of the hand 8.

As shown in FIG. 18, FIG. 19 and FIG. 20, a plurality types of hand 8 are prepared, and an appropriate one suited to a form, size or other parameter of the parts 3 to be picked up is selected for use. Replacement of the hand 8 with a new one may be executed automatically, or on the contrary, manually.

In FIG. 18, FIG. 19 and FIG. 20, the hand 8 has a form similar to that of a fork, which is one of tableware, and 8b indicates a claw attached to the hand 8, and a length of the claw 8b and a number of claws 8b attached thereto vary according to a type of each hand. For instance, in the hand 8 shown in FIG. 18, a length of the claw 8b is d1, a width thereof is w1, and a number thereof is 5 pieces.

To prevent interference between the claw 8b and the pin 21b when picking up parts, the width w1 of the claw 8b is smaller than of a space t between adjoining pins 21b, and a space between claws 8b is larger than size of the pin 21.

Figure 21:
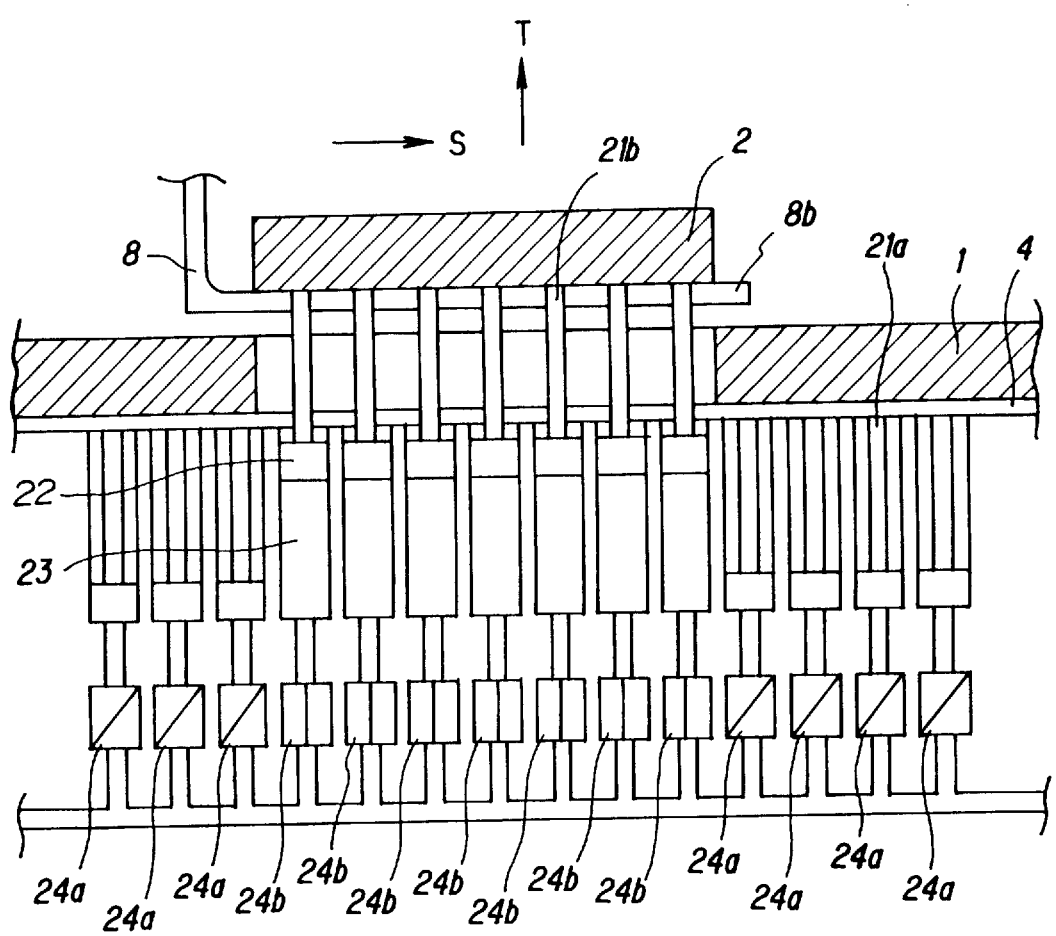
FIG. 21 is a cross sectional view showing a relation between a pin up-movement mechanism and a hand according to Embodiment 3.
Figure 22:
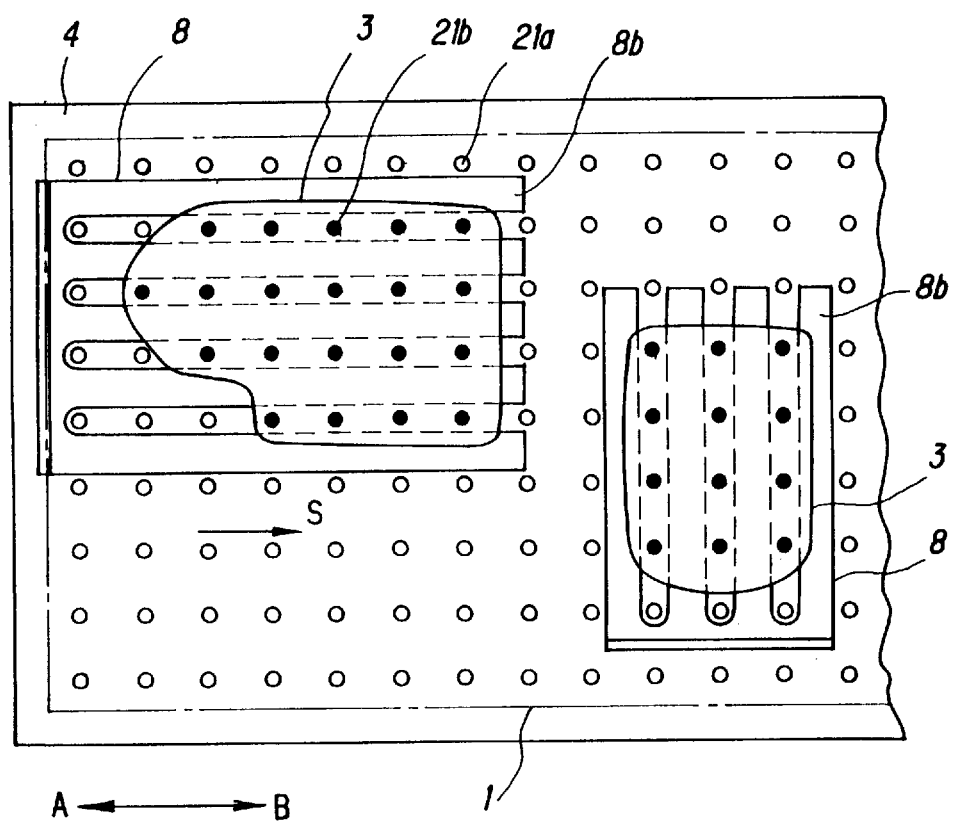
FIG. 22 is a general plan view showing a relation between the pin up-movement mechanism and the hand according to Embodiment 3.
Figure 24:
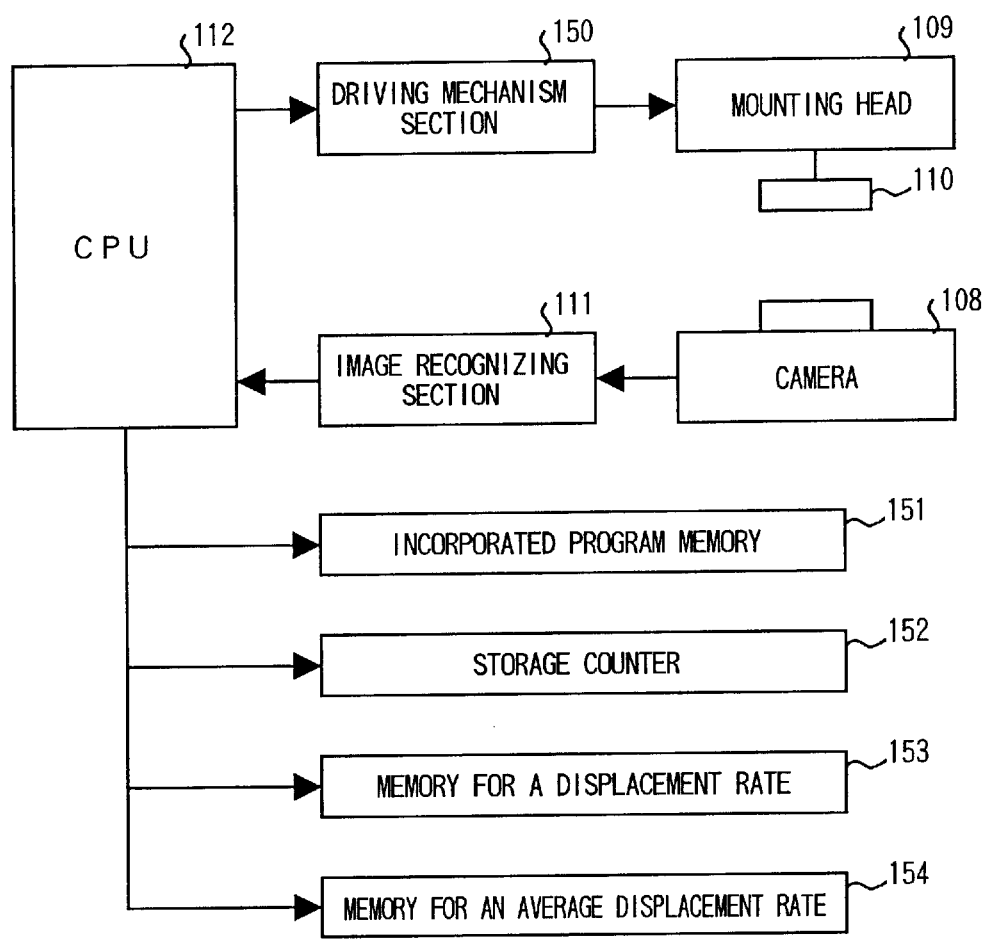
FIG. 24 is a block diagram showing configuration of another pickup device according to the conventional type thereof.
Figure 25:
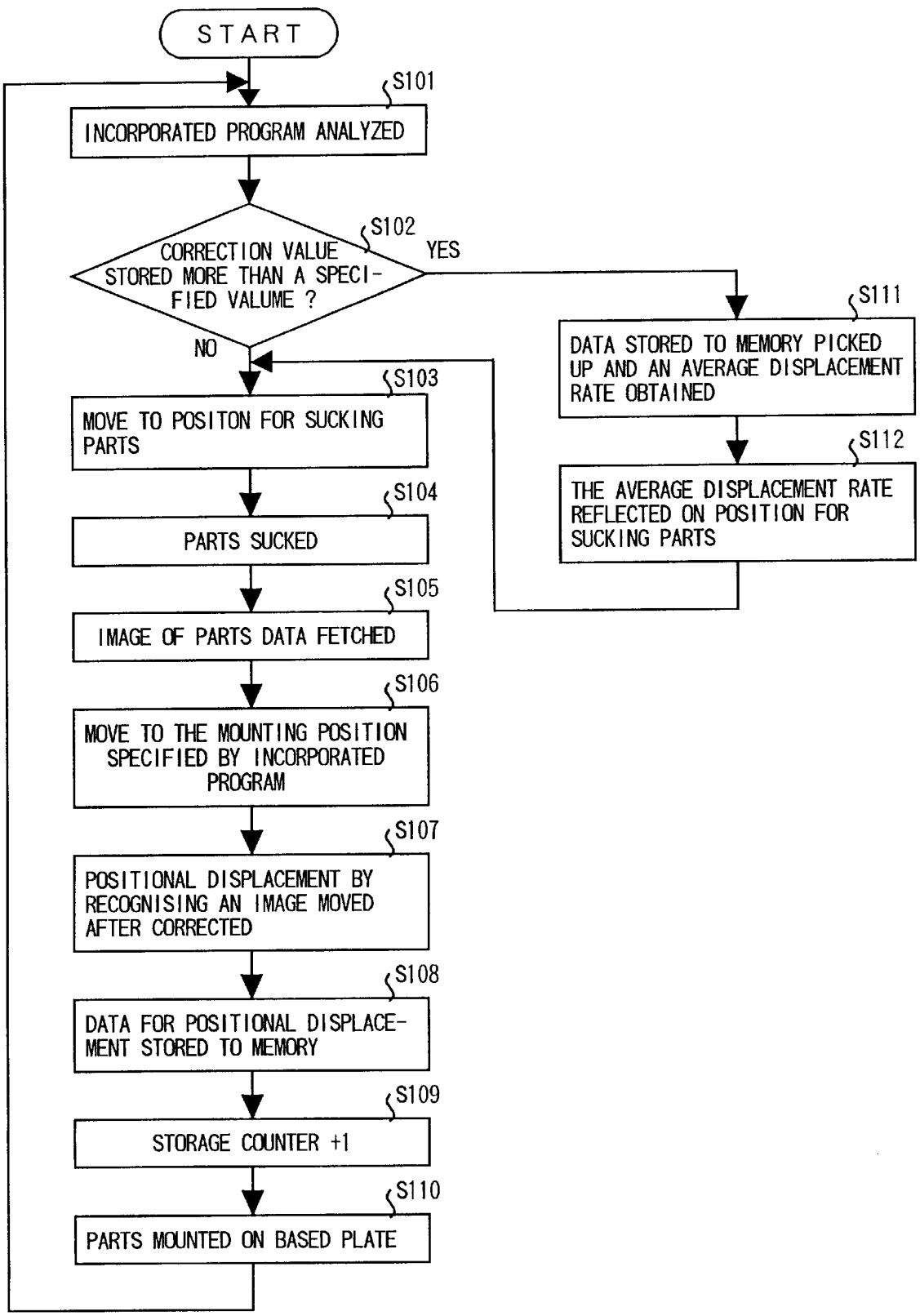
FIG. 25 is a flow chart showing operations for another pickup device according to the conventional type thereof.
Figure 26:
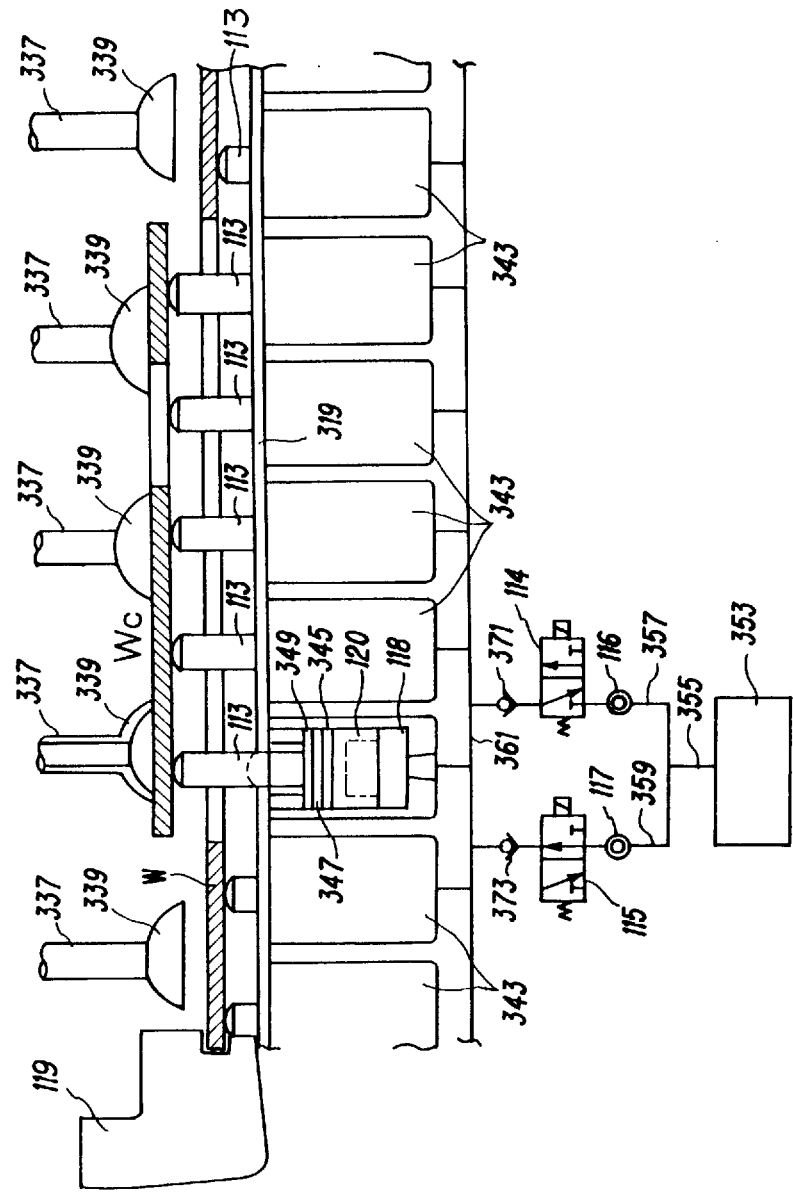
FIG. 26 is an explanatory view showing general configuration of another pickup device according to the conventional type thereof.

Next, a description is made for operations in Embodiment 3. FIG. 21 is a cross-sectional view showing a relation between the pin up-movement mechanism and the hand 8, and FIG. 22 is a substantially flat view showing a relation between the pin up-movement mechanism and the hand 8. It should be noted that, in FIG. 21, the pin up-movement mechanism itself is the same as that in FIG. 7 shown in Embodiment 1, and for this reason description thereof is omitted herein.

In FIG. 21 and FIG. 22, at first the claws 8b of the hand 8 are inserted into a space formed between the bottom surface section of the parts 3 raised up by the pins 21b required for raising upward the parts 3 to be raised and an upper surface section of the work 1 in the direction as indicated by the arrow S in the figure so that it will become parallel to the bottom surface of the parts 3. Then, as shown in FIG. 22, the hand 8 is inserted so that the raised pins 21 will be inserted into a space t between claws 8b of the hand.

Then the claws 8b are inserted up to a prespecified position, and when the insertion is complete, the hand 8 is moved upward (in the direction indicated by the arrow T), and the parts 3 is raised upward as if being scooped up. Then to prevent the parts 3 from dropping off, a posture of the claws 8b is kept in a constant state so that the parts is always kept in the horizontal direction. The parts 3 scooped up as described above is mounted on the discharge conveyor 10 like in Embodiment 1.

(Method of deciding a posture of a hand when inserted)

Next description is made for a method of deciding a posture of the hand 8 when inserted. At first, the most suited hand 8 is selected according to a form, size of other parameters of the parts to be picked up. Then only one position for insertion is decided according to data of the hand 8 selected as described above and data concerning displacement rate computed by the displacement rate computing section 14.

In order to prevent the interference between the pins 21b and the claws 8b, there are four conceivable directions for inserting the hand 8 from an inserting position decided as described above in the horizontal and vertical directions to respond to the pins 21 arrayed in the horizontal and vertical directions as shown in FIG. 22. Furthermore, additional four directions each inclined by 45 degrees against the horizontal or vertical direction are conceivable, so that totally eight directions are conceivable, and a direction most suited for picking up the parts to be picked up is selected from the eight directions.

With Embodiment 3, the bottom surface section of parts is supported by a plurality of claws during an operation for picking it up, so that a plurality pieces of parts piled up can be picked up all at once, and also even in a case of a material not suited to work clamping such as a cloth or a sheet material, desired parts can accurately be picked up.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pickup device for picking up parts, the device comprising;
   a storage means for storing positional data for said parts;
   a position detecting means for detecting a position of said parts by first computing a respective quadrangle circumscribing a boundary of said part, a longitudinal direction of said part and a center of gravity within said quadrangle;
   a displacement rate computing means for computing a displacement rate between positional data stored in said storage means and the position detected by said position detecting means;
   a plurality of claws movable in three dimensions for contacting picking up and carrying either one or a pile of said parts;
   an insertion posture determining means for determining an insertion position of said claws with respect to said longitudinal direction of said parts and an insertion posture such as an insertion direction according to said displacement rate; and
   a moving means for moving said claws according to the insertion posture determined by said insertion posture determining means.

2. A pickup device according to claim 1, further comprising:
   a plurality of support plates for elevating ones of said parts;
   a support plate selecting means for selecting a support plate or support plates required for elevating desired ones of said parts; and
   a support plate movement control means for raising a support plate or plates selected by said support plate selecting means.

3. A pickup device according to claim 2, further comprising:
   an interfering support plate removing means for removing a support plate or plates causing interference with said claws when inserting said claws beneath said parts, from among those support plates selected by said support plate selecting means.

4. A pickup device according to claim 1, further comprising:
   a plurality of pins for elevating said parts;
   a pin selecting means for selecting a pin or pins required for elevating required ones of said parts; and
   a pin movement control means for moving pins selected by said pin selecting means.

5. A pickup device according to claim 4, further comprising:
   a plurality of support plates elevating said parts;
   a support plate selecting means for selecting a support plate or support plates required for elevating desired ones of said parts; and
   a support plate movement control means for raising a support plate or plates selected by said support plate selecting means.

6. A pickup device for picking up parts, the device comprising;
   a storage means for storing positional data for said parts;
   a position detecting means for detecting a position of said parts;
   a displacement rate computing means for computing a displacement rate between positional data stored in said storage means and the position detected by said position detecting means;
   a holding means for picking up said parts by holding the parts;
   an insertion posture determining means for determining an insertion position of said holding means against said parts and an insertion posture such as an insertion direction according to a displacement rate computed by said displacement rate computing means; and
   a moving means for moving said holding means according to the insertion posture determined by said insertion posture determining means;
   a plurality of support plates for elevating ones of said parts;
   a support plate selecting means for selecting a support plate or support plates required for elevating desired ones of said parts;
   a support plate movement control means for raising a support plate or plates selected by said support plate selecting means;
   an interfering support plate removing means for removing a support plate or plates causing interference with said holding means, when inserting said holding means into said parts, from among those support plates selected by said support plate selecting means.

7. A pickup device for picking up parts, the device comprising;
   a storage means for storing positional data for said parts;
   a position detecting means for detecting a position of said parts;
   a displacement rate computing means for computing a displacement rate between positional data stored in said storage means and the position detected by said position detecting means;
   a holding means for picking up said parts by holding the parts;
   an insertion posture determining means for determining an insertion position of said holding means against said parts and an insertion posture such as an insertion direction according to a displacement rate computed by said displacement rate computing means; and
   a moving means for moving said holding means according to the insertion posture determined by said insertion posture determining means;
   a plurality of support plates for elevating ones of said parts;
   a support plate selecting means for selecting a support plate or support plates required for elevating desired ones of said parts;
   a support plate movement control means for raising a support plate or plates selected by said support plate selecting means;
   a plurality of pins for elevating said parts;

a pin selecting means for selecting a pin or pins required for elevating required ones of said parts;

a pin movement control means for moving pins selected by said pin selecting means; and;

an interfering pin removing means for removing a pin or pins causing interference with said holding means, when inserting said holding means into said parts, from the pins selected by said pin selecting means.

8. A pickup device for picking up parts, the device comprising;

a storage means for storing positional data for said parts;

a position detecting means for detecting a position of said parts;

a displacement rate computing means for computing a displacement rate between positional data stored in said storage means and the position detected by said position detecting means;

a holding means for picking up said parts by holding the parts, further comprising;

a plurality of claws provided at a space preventing interference with said pin, and said insertion posture determining means determines an insertion posture of said claws against ones of said parts according to a displacement rate computed by said displacement rate computing means so that interference between said claws and said pins will not occur; and an insertion posture determining means for determining an insertion position of said holding means against said parts and an insertion posture such as an insertion direction according to a displacement rate computed by said displacement rate computing means; and a moving means for moving said holding means according to the insertion posture determined by said insertion posture determining means;

a plurality of support plates for elevating ones of said parts;

a support plate selecting means for selecting a support plate or support plates required for elevating desired ones of said parts;

a support plate movement control means for raising a support plate or plates selected by said support plate selecting means;

a plurality of pins for elevating said parts;

a pin selecting means for selecting a pin or pins required for elevating required ones of said parts;

a pin movement control means for moving pins selected by said pin selecting means; and; "an interfering pin removing means for removing a pin or pins causing interference with said holding means, when inserting said holding means into said parts, from the pins selected by said pin selecting means."

9. A pickup device according to claim 7, further comprising;

a plurality of support plates pushing up said parts;

a support plate selecting means for selecting a support plate or support plates required for elevating ones of said parts;

a support plate movement control means for raising a support plate or plates selected by said support plate selecting means; and an interfering support plate removing means for removing a support plate or plates causing interference with said holding means, when inserting said holding means into said parts, from support plates selected by said support plate selecting means.

10. A pickup device for picking up parts, the device comprising;

a storage means for storing positional data for said parts;

a position detecting means for detecting a position of said parts;

a displacement rate computing means for computing a displacement rate between positional data stored in said storage means and the position detected by said position detecting means;

a holding means for picking up said parts by holding the parts;

an insertion posture determining means for determining an insertion position of said holding means against said parts and an insertion posture such as an insertion direction according to a displacement rate computed by said displacement rate computing means; and a moving means for moving said holding means according to the insertion posture determined by said insertion posture determining means;

a plurality of support plates for elevating ones of said parts;

a support plate selecting means for selecting a support plate or support plates required for elevating desired ones of said parts;

a support plate movement control means for raising a support plate or plates selected by said support plate selecting;

a plurality of pins for elevating said parts;

a pin selecting means for selecting a pin or pins required for elevating required ones of said parts;

a pin movement control means for moving pins selected by said pin selecting means;

a plurality of support plates elevating said parts;

a support plate selecting means for selecting a support plate or support plates required for elevating desired ones of said parts;

a support plate movement control means for raising a support plate or plates selected by said support plate selecting means; and an interfering support plate removing means for removing a support plate or plates causing interference with said holding means, when inserting said holding means into said parts, from support plates selected by said support plate selecting means.

* * * * *